US009189216B2

(12) United States Patent
Yamamoto

(10) Patent No.: US 9,189,216 B2
(45) Date of Patent: Nov. 17, 2015

(54) POWER CONSUMPTION DESIGN-OPTIMIZATION OF A COMMUNICATION DEVICE SOFTWARE PROGRAM

(71) Applicant: FUJITSU LIMITED, Kawasaki-shi (JP)

(72) Inventor: Tatsuya Yamamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 446 days.

(21) Appl. No.: 13/676,204

(22) Filed: Nov. 14, 2012

(65) Prior Publication Data

US 2013/0132048 A1    May 23, 2013

(30) Foreign Application Priority Data

Nov. 18, 2011    (JP) .................................. 2011-252283

(51) Int. Cl.
| | |
|---|---|
| G06F 9/45 | (2006.01) |
| G06F 11/34 | (2006.01) |
| G06F 11/30 | (2006.01) |
| G06F 11/36 | (2006.01) |

(52) U.S. Cl.
CPC ............ *G06F 8/4432* (2013.01); *G06F 11/302* (2013.01); *G06F 11/3062* (2013.01); *G06F 11/3452* (2013.01); *G06F 11/368* (2013.01); *G06F 2217/10* (2013.01); *G06F 2217/78* (2013.01); *Y02B 60/18* (2013.01)

(58) Field of Classification Search
None
See application file for complete search history.

(56) References Cited

U.S. PATENT DOCUMENTS

| 7,174,468 B2 * | 2/2007 | Gary et al. ..................... 713/300 |
|---|---|---|
| 7,287,173 B2 * | 10/2007 | Hsieh ............................ 713/300 |
| 8,522,193 B2 * | 8/2013 | Barness et al. ................ 717/127 |
| 8,898,049 B2 * | 11/2014 | Dhanwada et al. ............. 703/13 |
| 2004/0268159 A1 * | 12/2004 | Aasheim et al. .............. 713/300 |

FOREIGN PATENT DOCUMENTS

| JP | 2003-345472 | 12/2003 |
|---|---|---|
| JP | 2006-178785 | 7/2006 |
| JP | 2007-249974 | 9/2007 |

(Continued)

OTHER PUBLICATIONS

Hooker, David "Seven Principles of Software Development" Wayback Machine Internet Archive (1996) available at <http://web.archive.org/web/19961129194425/http://c2.com/cgi/wiki?SevenPrinciplesOfSoftwareDevelopment>.*

(Continued)

*Primary Examiner* — Aniss Chad
*Assistant Examiner* — Jay B Hann
(74) *Attorney, Agent, or Firm* — Fujitsu Patent Center

(57) ABSTRACT

A calculation unit performs statistical analysis of functions used in a software program under development. From the result of this statistical analysis, the calculation unit calculates indicators of possibility that executing a plurality of functions in combination improves power consumption, relative to the case of executing these functions separately, thus producing a table that associates combinations of functions with such indicators. The produced table is stored in a storage unit. A searching unit searches source code of the software program under development to find a source code portion that includes one of the combinations of functions in the stored table. A displaying unit displays the found source code portion in a manner distinguishable from other portions of the source code.

11 Claims, 26 Drawing Sheets

(56) References Cited

FOREIGN PATENT DOCUMENTS

| | | |
|---|---|---|
| JP | 2009-163576 | 7/2009 |
| JP | 2010-225133 | 10/2010 |

OTHER PUBLICATIONS

Kansal, Aman & Zhao, Feng "Fine-Grained Energy Profiling for Power-Aware Application Design" Association for Computing Machinery, vol. 36, issue 2, pp. 26-31 (2008) available from <http://dl.acm.org/citation.cfm?id=1453180>.*

Simunic, Tajana, et al. "Source Code Optimization and Profiling of Energy Consumption in Embedded Systems" IEEE System Synthesis, proceedings, pp. 193-198 (2000) available from <http://ieeexplore.ieee.org/xpls/abs_all.jsp?arnumber=874049>.*

Ibrahim, Mostafa, et al. "Code Transformations and SIMD Impact on Embedded Software Energy/Power Consumption" IEEE Int'l Conf. on Computer Engineering & Systems, pp. 27-32 (2009) available from <http://ieeexplore.ieee.org/xpls/abs_all.jsp?arnumber=5383317>.*

Tan, Pang-Ning, et al. "Chapter 6. Association Analysis: Basic Concepts and Algorithms" Introduction to Data Mining (2006) available from <http://www-users.cs.umn.edu/~kumar/dmbook/index.php>.*

* cited by examiner

FIG. 4

EXECUTION TRACE LOG
201

| TIME (ms) | ACTION | METHOD |
|---|---|---|
| 10 | start | A |
| 11 | end | A |
| 12 | start | B |
| 13 | start | C |
| 14 | end | C |
| 15 | end | B |
| ... | ... | ... |

FIG. 5

CURRENT MEASUREMENT LOG
202

| TIME (ms) | ELECTRIC CURRENT (mA) |
|---|---|
| 10 | 120 |
| 11 | |
| 12 | 130 |
| 13 | 140 |
| 14 | |
| 15 | |
| ... | ... |

FIG. 6

MATRIX 112a

```
time, Pt, androidutilFloatMathceilFF,androidgraphicsPaintmeasureTextLjavalangCharSequenceIF,
5.298000|1|0,0,0,0,0,0,0,0,0,0,0,0,0,0,0,0,0,0,0,0,0,0,0,0,0,0,0,0,0,0,0,1,0,0,0,...
5.299000|0|0,0,0,0,0,0,0,0,0,0,0,0,0,0,0,0,0,0,0,0,0,0,0,0,0,0,0,0,0,0,0,0,1,0,0,...
5.300000|1|0,0,0,0,0,0,0,0,0,0,0,0,0,0,0,0,0,0,0,0,0,0,0,0,0,0,0,1,0,0,0,1,0,0,0,...
5.301000|1|0,0,0,0,0,0,0,0,0,0,0,0,0,0,0,0,0,0,0,0,0,0,0,0,0,0,0,0,1,0,0,1,0,0,0,...
5.302000|0|0,0,0,0,0,0,0,0,0,0,0,0,0,0,0,0,0,0,0,0,0,0,0,0,0,0,0,0,1,0,0,1,0,0,0,...
5.303000|1|0,0,0,0,0,0,0,0,0,0,0,0,0,0,0,0,0,0,0,0,0,0,0,0,0,0,0,0,1,0,0,1,0,0,0,...
5.304000|0|0,0,0,0,0,0,0,0,0,0,0,0,0,0,0,0,0,0,0,0,0,0,0,0,0,0,0,0,1,0,0,1,0,0,0,...
5.305000|1|0,0,0,0,0,0,0,0,0,0,0,0,0,0,0,0,0,0,0,0,0,0,0,0,0,0,0,0,1,0,0,1,0,0,0,...
5.306000|0|0,0,0,0,0,0,0,0,0,0,0,0,0,0,0,0,0,0,0,0,0,0,0,0,0,0,0,0,1,0,0,1,0,0,0,...
5.307000|1|0,0,0,0,0,0,0,0,0,0,0,0,0,0,0,0,0,0,0,0,0,0,0,0,0,0,0,0,1,0,0,1,0,0,0,...
5.308000|0|0,0,0,0,0,0,0,0,0,0,0,0,0,0,0,0,0,0,0,0,0,0,0,0,0,0,0,0,1,0,0,0,0,0,0,...
5.309000|1|0,0,0,0,0,0,0,0,0,0,0,0,0,0,0,0,0,0,0,0,0,0,0,0,0,0,0,0,0,0,0,1,0,0,0,...
5.310000|1|0,0,0,0,0,0,0,0,0,0,0,0,0,0,0,0,0,0,0,0,0,0,0,0,0,0,0,0,0,0,0,0,0,0,0,...
...
```

Pt values

FIG. 7

CODE-TO-METHOD MAPPING TABLE
114a

| SOURCE CODE | METHOD | METHOD |
|---|---|---|
| button.setText("button"); | android/util/SWparse/IntArray | |
| setImageDrawable() | Android/graphics/Canvas | Android/view/View.is |
| ... | ... | ... |

FIG. 8

115a  ASSOCIATION ANALYSIS RESULT

```
  lhs                                                              rhs           support      confidence   lift
1 {android.graphics.CanvassetDensity...I.V,
   android.graphics.CanvasisOpaque...Z}                    => {CURRENT} 0.02394527  0.60344828   1.5769861
2 {android.graphics.RectisEmpty...Z,
   android.graphics.CanvassetDensity...I.V}                => {CURRENT} 0.02394527  0.60344828   1.4769770
3 {android.graphics.CanvasisOpaque...Z}                    => {CURRENT} 0.02337514  0.60294118   1.324360
4 {android.graphics.CanvassetDensity...I.V,
   android.os.SystemClockuptimeMillis...J}                 => {CURRENT} 0.02337514  0.60294118   1.2733750
5 {android.graphics.CanvassetDensity...I.V,
   android.graphics.CanvasisOpaque...Z}                    => {CURRENT} 0.02337514  0.60294118   1.1734760
6 {android.graphics.RectisEmpty...V,
   android.os.SystemClockuptimeMillis...J}                 => {CURRENT} 0.02337514  0.60294118   1.1734760
7 {android.graphics.CanvassetDensity...I.V,
   android.graphics.RectsetEmpty...J,
   android.os.SystemClockuptimeMillis...J}                 => {CURRENT} 0.02337514  0.60294118   4.1734760
   ......
```

FIG. 9

| POWER CONSUMPTION (μWs) | CURRENT (mA) | PROBABILITY (%) | IMPROVEMENT RATIO |
|---|---|---|---|
| 1036 | 140 | 40 | 1.1 |
| 962 | 130 | 60 | 1.2 |
| 888 | 120 | 70 | 1.1 |
| 814 | 110 | 70 | 1.1 |

ASSOCIATION ANALYSIS INFORMATION 115b

888 μWs

| INDEX | METHOD PATTERN | POWER TENDENCY | IMPROVE-MENT RATIO |
|---|---|---|---|
| 1 | android.graphics.CanvassetDensity..I.V, android.graphics.CanvasisOpaque...Z | 0.60344828 | 1.4 |
| 2 | android.graphics.RectisEmpty..Z,android.graphics. CanvassetDensity..I.V,android.graphics.CanvasisOpaque..Z | 0.60344828 | 1.2 |
| 3 | android.graphics.CanvassetDensity..I, android.os.SystemClockuptimeMillis...J | 0.60294118 | 1.1 |

FIG. 10B

ASSOCIATION ANALYSIS INFORMATION 115c

962 μWs

| INDEX | METHOD PATTERN | POWER TENDENCY | IMPROVE-MENT RATIO |
|---|---|---|---|
| 1 | android.graphics.CanvassetDensity..I.V, android.graphics.CanvasisOpaque...Z | 0.76344828 | 1.5 |
| 2 | android.graphics.RectisEmpty..Z,android.graphics. CanvassetDensity..I.V,android.graphics.CanvasisOpaque..Z | 0.80344828 | 1.2 |
| 3 | android.graphics.CanvassetDensity..I, android.os.SystemClockuptimeMillis...J | 0.8294118 | 1.2 |

FIG. 10C

ASSOCIATION ANALYSIS INFORMATION 115d

1036 μWs

| INDEX | METHOD PATTERN | POWER TENDENCY | IMPROVE-MENT RATIO |
|---|---|---|---|
| 1 | android.graphics.CanvassetDensity..I.V, android.graphics.CanvasisOpaque...Z | 0.66344828 | 1.5 |
| 2 | android.graphics.RectisEmpty..Z,android.graphics. CanvassetDensity..I.V,android.graphics.CanvasisOpaque..Z | 0.80344828 | 1.4 |
| 3 | android.graphics.CanvassetDensity..I, android.os.SystemClockuptimeMillis...J | 0.8294118 | 1.3 |

FIG. 11

POWER TENDENCY TABLE
13a

| INDEX | METHOD PATTERN | POWER CONSUMPTION | POWER TENDENCY | IMPROVEMENT RATIO |
|---|---|---|---|---|
| 1 | android.graphics.CanvassetDensity..IV, android.graphics.CanvasIsOpaque...Z | 1036 | 0.60344828 | 1.5 |
| 2 | android.graphics.RectIsEmpty..Z,android.graphics. CanvassetDensity..IV,android.graphics.CanvasIsOpaque..Z | 888 | 0.60344828 | 1.4 |
| 3 | android.graphics.CanvassetDensity..I, android.os.SystemClockuptimeMillis...J | 962 | 0.60294118 | 1.3 |

FIG. 12

SOFTWARE IMPROVEMENT TABLE
15a

| SOURCE CODE | METHOD | METHOD | IMPROVEMENT RATIO |
|---|---|---|---|
| button.setText("button"); | android/util/SWparse/IntArray | Android/view/View.is | 1.5 |
| setImageDrawable() | Android/graphics/Canvas | ... | 1.3 |
| ... | ... | | ... |

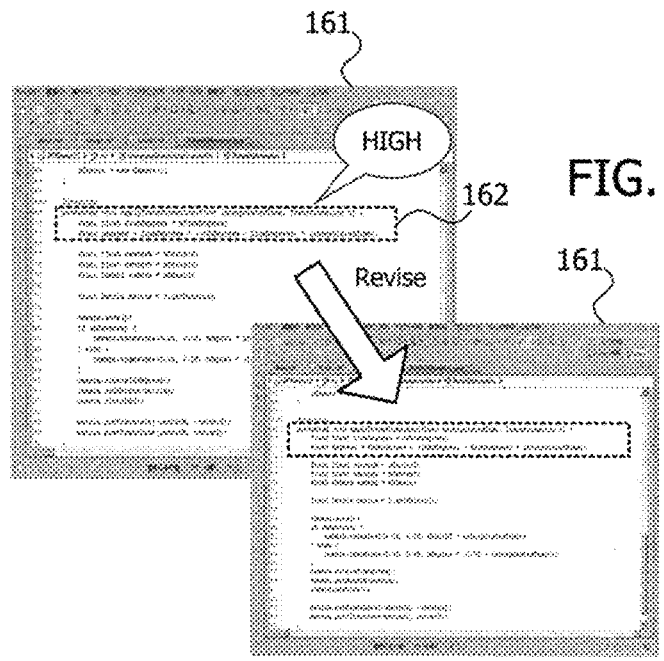

SOFTWARE IMPROVEMENT TABLE
15a

| METHOD | METHOD | METHOD | IMPROVEMENT RATIO |
|---|---|---|---|
| CanvassetDensity | CanvasisOpaque | RectisEmpt | 1.5 |
| SystemClockuptimeMillis | CanvasisOpaque | | 1.3 |

SOFTWARE IMPROVEMENT TABLE
15a

| METHOD | METHOD | METHOD | IMPROVEMENT RATIO |
|---|---|---|---|
| CanvassetDensity | CanvasisOpaque | RectisEmpt | 1.5 |
| SystemClockuptimeMillis | CanvasisOpaque | | 1.4 |
| CanvassetDensity | RectsetEmpty | | 1.2 |

SOFTWARE IMPROVEMENT TABLE 15a

| SOURCE CODE | METHOD | METHOD | METHOD | IMPROVE-MENT RATIO |
|---|---|---|---|---|
| ... | CanvassetDensity | CanvasisOpaque | RectisEmpt | 1.5 |
| ... | SystemClockuptimeMillis | CanvasisOpaque | | 1.4 |
| ... | CanvassetDensity | RectsetEmpty | | 1.2 |

SOFTWARE IMPROVEMENT TABLE 15a

| SOURCE CODE | METHOD | METHOD | IMPROVE-MENT RATIO |
|---|---|---|---|
| ... | CanvassetDensity | CanvasisOpaque | 1.2 |
| ... | SystemClockup | CanvasUnique | 1.3 |
| ... | CanvassetINIT | RectsetFull | 0.9 |

CODE-POWER ASSOCIATION TABLE 18a

| CODE-REVISION-MAPPED METHOD | POWER CONSUMPTION | IMPROVE-MENT RATIO |
|---|---|---|
| Camera.rotateY(degress);<br>Camera.getMatrix(matrix); | 888 | 1.5 |
| Matrix.preTranslate(centerX, centerY); | 888 | 1.2 |
| Camera.rotateY(degress);<br>Camera.getMatrix(matrix);<br>Matrix.preTranslate(centerX, centerY); | 888 | 1.8 |
| camera.translate(0.0f,0.0f,m Depth2*interpolatedTime) | 962 | 1.3 |
| Camera.rotateY(degress);<br>Camera.getMatrix(matrix);<br>Matrix.preTranslate(centerX, centerY);<br>camera.translate(0.0f,0.0f,m Depth2*interpolatedTime) | 888 | 1.5 |

SOFTWARE IMPROVEMENT TABLE 15a

| SOURCE CODE | METHOD | METHOD | METHOD | IMPROVE-MENT RATIO |
|---|---|---|---|---|
| button.setText("button"); | SystemClockuptimeMillis | CanvasisOpaque | | 1.4 |
| setDraw() | CanvassetDensity | CanvasisOpaque | RectisEmpt | 1.5 |
| getCanvas() | CanvassetDensity | RectsetEmpty | | 1.2 |

POWER TENDENCY TABLE 13a

| INDEX | METHOD PATTERN | POWER CONSUMPTION | POWER TENDENCY | IMPROVE-MENT RATIO |
|---|---|---|---|---|
| 1 | SystemClockuptimeMillis CanvasisOpaque | 962 | 0.8294118 | 1.3 |
| 2 | CanvassetDensity | 50 | 0.66344828 | 1.4 |
| 3 | android.graphics.RectisEmpty..Z,android.graphics. CanvassetDensity..I.V,android.graphics.CanvasisOpaque..Z | 1036 | 0.80344828 | 1.5 |
| 4 | RectsetEmpty | 80 | 0.8294118 | 1.3 |

POWER CONSUMPTION DESIGN-OPTIMIZATION OF A COMMUNICATION DEVICE SOFTWARE PROGRAM

CROSS-REFERENCE TO RELATED APPLICATION

This application is based upon and claims the benefit of priority of the prior Japanese Patent Application No. 2011-252283, filed on Nov. 18, 2011, the entire contents of which are incorporated herein by reference.

FIELD

The embodiments discussed herein relate to a design-aiding apparatus and method.

BACKGROUND

The development process of an application program for radio communication devices and the like involves evaluation of how much electric power is consumed by the hardware platform with the application program running thereon. There are several techniques for estimating and evaluating power consumption of application programs.

For example, one proposed method performs multiple regression analysis on the samples of load of a central processing unit (CPU) and other parameters, formulates therefrom a linear approximation formula for evaluating power consumption, and estimates power consumption of an application program under development by using that formula. Another proposed method collects measurements of power consumption for each individual process module constituting an application under development and estimates therefrom the power consumption of the application program as a whole. See, for example, the following documents:
 Japanese Laid-open Patent Publication No. 2010-225133
 Japanese Laid-open Patent Publication No. 2003-345472

The power consumption of an application program varies with the load conditions during its execution. For this reason, the linear approximation-based estimation method noted above is configured to run application programs several times under different load conditions and use the resulting data to produce a linear approximation formula. The method therefore spends a lot of time to determine the modeling parameters for power estimation. In other words, it takes a long time to collect data about power consumption.

SUMMARY

According to an aspect of the embodiments to be discussed herein, there is provided a design-aiding apparatus that includes a processor configured to perform a procedure. The procedure includes: performing statistical analysis of functions used in a software program under development and calculating, from a result of the statistical analysis, indicators each indicating a possibility that executing a plurality of functions in combination improves power consumption, relative to a case of executing the functions separately; producing analysis information that associates combinations of functions with the indicators calculated therefor; searching source code of the software program under development to find a source code portion that includes one of the combinations of functions in the analysis information; and displaying the found source code portion in a manner distinguishable from other portions of the source code.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 gives an example of an execution trace log;

FIG. 5 gives an example of a current measurement log;

FIG. 6 gives an example of a matrix produced by a matrix generation unit;

FIG. 7 gives an example of code-to-method mapping data;

FIG. 8 illustrates an exemplary result of association analysis;

FIG. 9 gives an example of summarized results of association analysis;

FIGS. 10A to 10C illustrate three examples of association analysis information;

FIG. 11 gives an example of power tendency data;

FIG. 12 gives an example of software improvement data;

FIGS. 13A and 13B illustrate an exemplary screen produced by an application developing unit according to the second embodiment;

FIG. 20 gives an example of code power association data;

FIG. 23 illustrates a specific example of how a code-power association table is produced;

DESCRIPTION OF EMBODIMENTS

Several embodiments of the proposed design-aiding apparatus will be described in detail below, with reference to the accompanying drawings.

(a) First Embodiment

Figure 1:
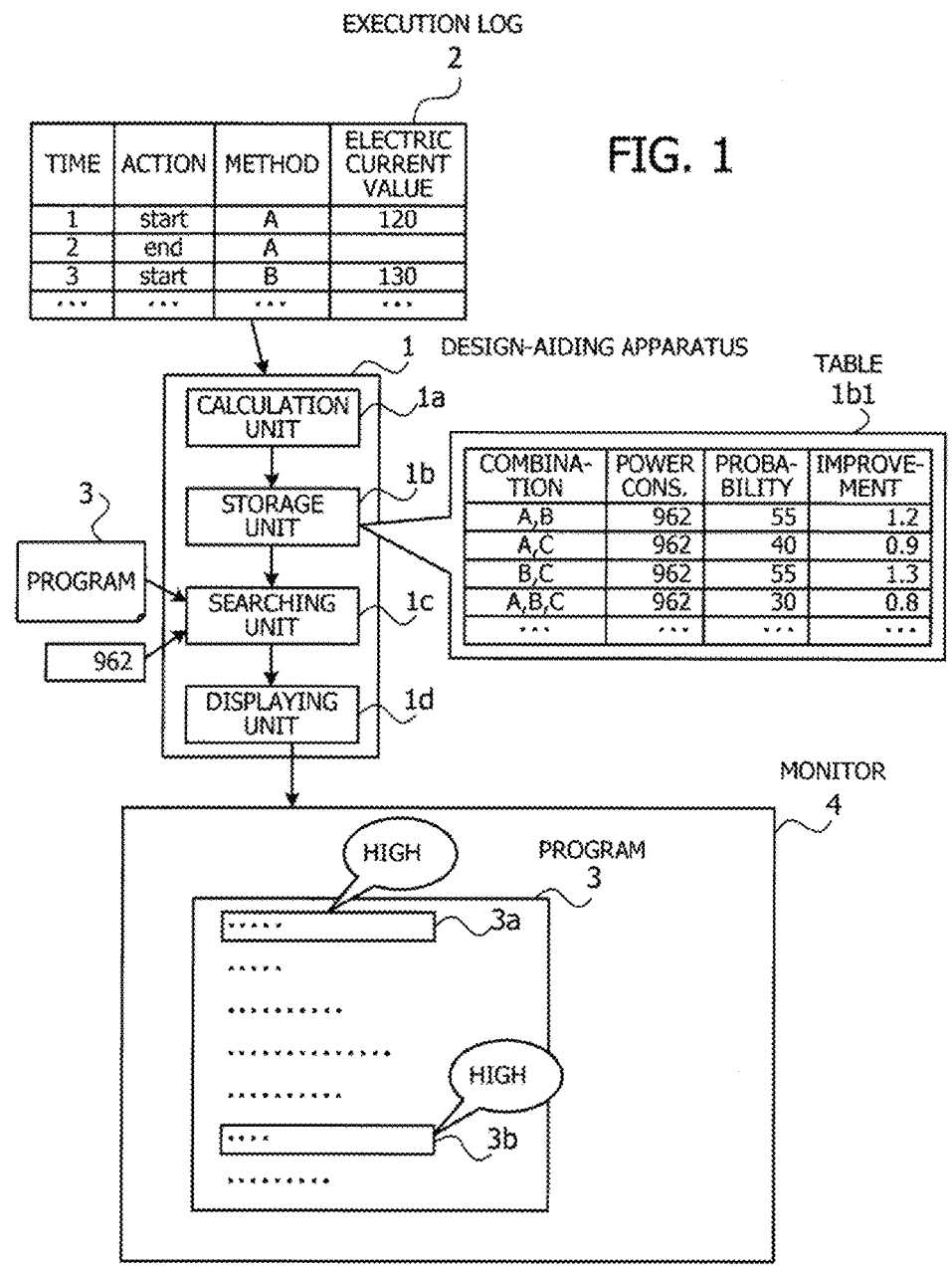
FIG. 1 illustrates a design-aiding apparatus according to a first embodiment.

FIG. 1 illustrates a design-aiding apparatus according to a first embodiment. The illustrated design-aiding apparatus (or computer) 1 according to the first embodiment includes a calculation unit 1a, a storage unit 1b, a searching unit 1c, and a displaying unit 1d. While not explicitly depicted in FIG. 1, the calculation unit 1a, searching unit 1c, and displaying unit 1d may be implemented as part of the functions of a central processing unit (CPU) in the design-aiding apparatus 1. The storage unit 1b may be implemented as part of random access memory (RAM) or hard disk drive (HDD) included in the design-aiding apparatus 1.

The calculation unit 1a calculates power consumption of functions used in a target program in the case where the functions are executed individually. This calculation of power consumption is performed by using an execution log 2 of the target program. Here the term "power consumption" is used to refer to the electric energy consumption resulting from execution of a program or one or more functions in the program. The target program, or the subject of statistical analysis, may be an application program or any other kind of computer programs under development. For exemplary purposes, the first embodiment assumes that target programs are written in the Java (registered trademark) programming language.

The execution log 2 is a collection of records describing actions related to Java methods executed in each time period (e.g., 1 msec). Those methods are an example of functions used in a program. Log records for action "start" include a current value that indicates how much electric current the method consumed in a 1-ms period. Suppose, for example, that the target program was executed on a processing device operating with a supply voltage of 3.7 [V]. In this case, the calculation unit 1a calculates power consumption of method A with reference to the execution log 2 as follows: 120 [mA]× 3.7 [V]×1 [msec]=444 [µWs].

With the calculated power consumption, the calculation unit 1a performs association analysis of each method used in the target program. Association analysis is a kind of statistical analysis. Association analysis permits the calculation unit 1a to calculate some indicators that indicate a possibility of improved power consumption when a plurality of methods are executed, not separately, but in combination. For example, in the case where the power consumption is calculated to be 962 [µWs], the association analysis may suggest that it would be possible to improve the power consumption of method A and method B if they are executed not separately, but sequentially. Specifically, the power consumption would exceed 962 [µWs] with a probability of 55%, and the expected improvement ratio is 1.2. In the terminology of association analysis, the noted probability and improvement ratio are called "confidence" and "lift." The values of probability (confidence) and improvement ratio (lift) are an example of the indicators mentioned above.

The calculation unit 1a produces a table 1b1 that associates each particular combination of methods in the target program with the calculated probability and improvement ratio. The produced table 1b1 is stored in a storage unit 1b. While the table 1b1 illustrated in FIG. 1 is for the power consumption of 962 [µWs], the design engineer may be allowed to specify any value of power consumption so that the design-aiding apparatus 1 produces a table 1b1 for the specified power consumption.

The searching unit 1c receives information that specifies an application program 3 under development, as well as a value of power consumption (e.g., 962 [µWs]) of which the design engineer would like to be notified with a pop-up message. Upon receipt of such input information, the searching unit 1c searches source code of the program 3 to find source code portions that include a combination of methods registered as a record of the table 1b1 with a probability of 50% or higher. The mentioned values, 962 [µWs] and 50%, are only for example, and the searching unit 1c may operate with other values of power consumption and probability. For illustrative purposes, suppose now that the searching unit 1c has located two source code portions respectively using the methods described in the first record and the fourth record in the table 1b1.

The program 3 includes source code portions 3a and 3b that respectively include methods described in the first and fourth records that the searching unit 1c has obtained. The displaying unit 1d outputs a pop-up message "HIGH" for these source code portions 3a and 3b of the program 3 to indicate that their corresponding combinations of methods are expected to consume power of 962 [µWs] or more with a certain confidence level, These pop-up messages "HIGH" make it easy for the design engineer to know that these source code portions 3a and 3b include power-consuming methods that are likely to exceed 962 [µWs]. It is noted that pop-up messages are only an exemplary technique for notifying the design engineer of such facts. The embodiments discussed in this specification are not limited by this specific notification method. Upon receiving the pop-up messages "HIGH," the designer may revise the indicated source code portions 3a and 3b and causes the calculation unit 1a to rerun the association analysis and produce a new version of the table 1b1 that reflects method combinations in the revised source code. The displaying unit 1d may be configured to consult the new table 1b1 and output another message on a screen of the monitor 4 to inform that the revised source code effectively reduces the power consumption. This message may be issued when the new method combination in a revised source code achieves an improvement greater than or equal to one. For example, the displaying unit 1d may indicate the achieved improvement value on a display screen of the monitor 4.

As can be seen from the above description of the proposed design-aiding apparatus 1, a calculation unit 1a is provided to calculate a probability and improvement ratio concerning increase or decrease of power consumption by using techniques of statistical analysis. This feature of the first embodiment permits the design engineer to be informed of power consumption of individual source code portions even in the design phase of software development. The first embodiment can produce such information more quickly than the conventional method using an approximation formula produced through multiple regression analysis.

The above description of the first embodiment has assumed the use of association analysis as an example of statistical analysis. It is noted, however, that the first embodiment and subsequent embodiments are not limited by the specific example discussed above. For instance, the embodiments may be configured to use association rule mining, cluster analysis, and other statistical techniques to achieve the purpose.

The next section will provide a second embodiment to disclose a more specific embodiment of the proposed design-aiding apparatus.

(b) Second Embodiment

Figure 2:
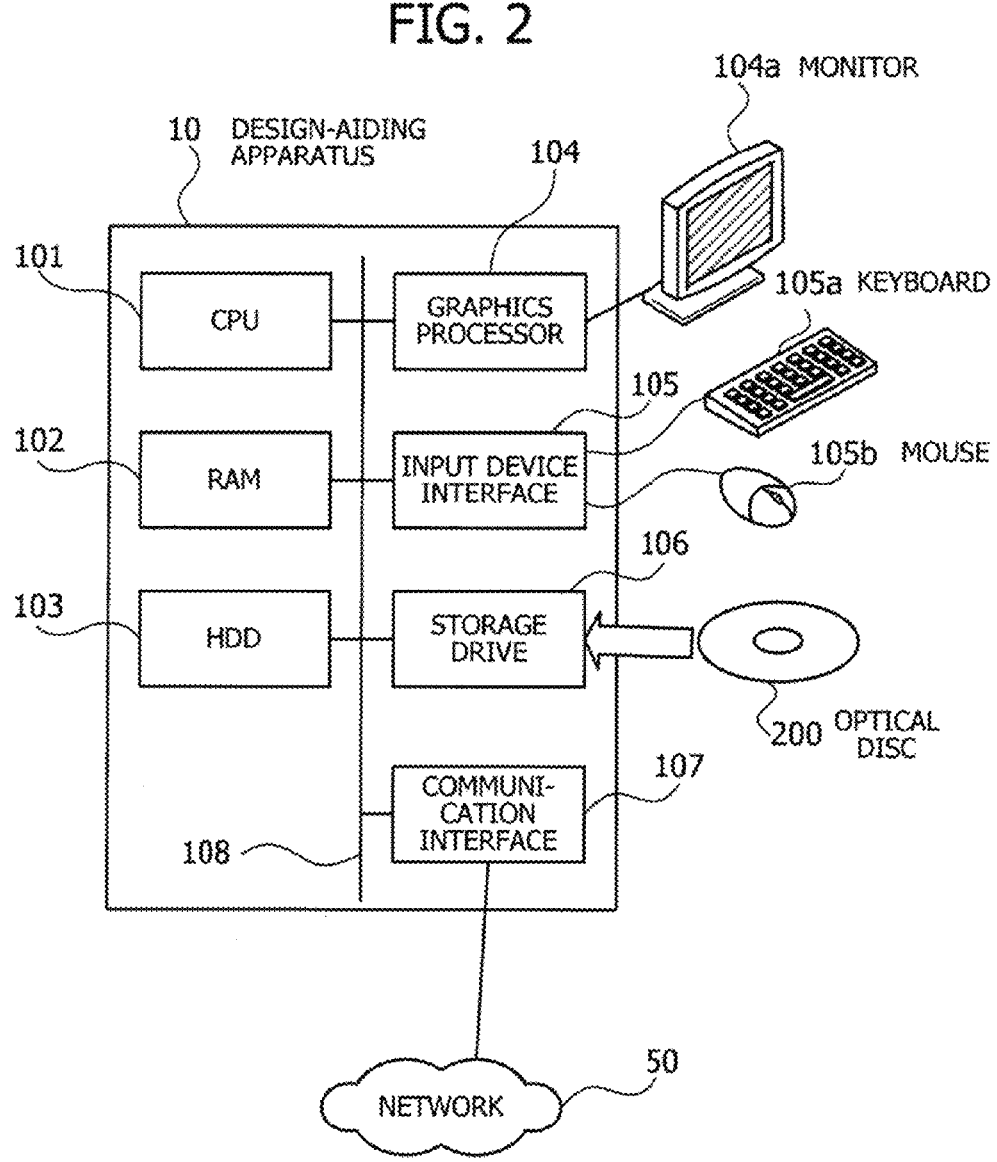
FIG. 2 illustrates a hardware configuration of a design-aiding apparatus according to a second embodiment.

FIG. 2 illustrates a hardware configuration of a design-aiding apparatus according to the second embodiment. The illustrated design-aiding apparatus 10 has a central processing unit (CPU) 101 to control its entire operation. The CPU 101 is connected to a random access memory (RAM) 102 and other various devices and interfaces on a bus 108.

The RAM 102 serves as primary storage of the design-aiding apparatus 10. Specifically, the RAM 102 is used to temporarily store at least some of the operating system (OS) programs and application programs that the CPU 101 executes, in addition to other various data objects that the CPU 101 may manipulate at runtime. Other devices on the bus 108 include a hard disk drive (HDD) 103, a graphics processor 104, an input device interface 105, a storage drive 106, and a communication interface 107.

The HDD 103 magnetically writes and reads data on its internal platters. The HDD 103 serves as secondary storage of the design-aiding apparatus 10 to store operating system programs and application programs, as well as various kinds of data files. Flash memory and other semiconductor memory devices may also be used as secondary storage, similarly to the HDD 103.

The graphics processor 104, coupled to a monitor 104a, produces video images in accordance with drawing commands from the CPU 101 and displays them on a screen of the monitor 104a. The monitor 104a may be, for example, a cathode ray tube (CRT) display or a liquid crystal display.

The input device interface 105 is connected to input devices such as a keyboard 105a and a mouse 105b and supplies signals from those devices to the CPU 101. The mouse 105b is a pointing device, which may be replaced with other kinds of pointing devices such as touchscreen, tablet, touchpad, and trackball.

The storage drive 106 may be an optical disc drive or an interface for Universal Serial Bus (USB) memories. In the former case, the storage drive 106 reads data out of an optical disc 200 by using laser light (i.e., as a reflection of light or the lack of same). Optical discs include, for example, Blu-ray Disc (registered trademark), digital versatile disc (DVD), DVD-RAM, compact disc read-only memory (CD-ROM), CD-Recordable (CD-R), and CD-Rewritable (CD-RW).

The communication interface 107 provides a link to a network 50 so that data can be exchanged with other computers or network devices (not illustrated).

The above-described hardware platform may be used to realize the processing functions of the second embodiment and other embodiments. As will be described below, the proposed design-aiding apparatus 10 includes several functions implemented on the hardware platform discussed in FIG. 2.

Figure 3:
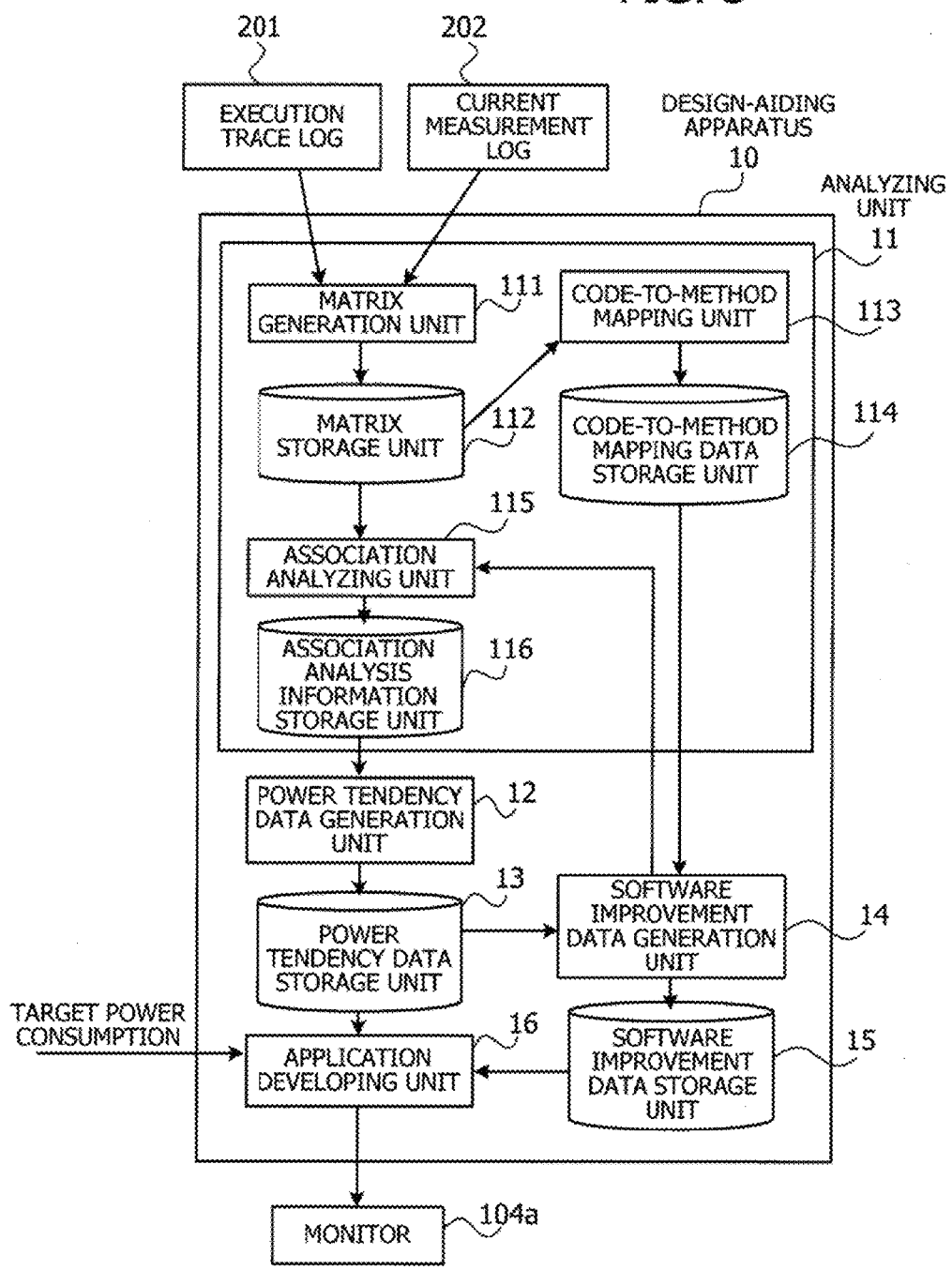
FIG. 3 is a functional block diagram of a design-aiding apparatus according to the second embodiment.

FIG. 3 is a functional block diagram of a design-aiding apparatus according to the second embodiment. The illustrated design-aiding apparatus 10 includes an analyzing unit 11, a power tendency data generation unit 12, a power tendency data storage unit 13, a software improvement data generation unit 14, a software improvement data storage unit 15, and an application developing unit 16. The analyzing unit 11 and power tendency data generation unit 12 are an exemplary implementation of the calculation unit 1a discussed previously in FIG. 1. The application developing unit 16 is an exemplary implementation of the searching unit 1c and displaying unit 1d discussed previously in FIG. 1.

The analyzing unit 11 is formed from a matrix generation unit 111, a matrix storage unit 112, a code-to-method mapping unit 113, a code-to-method mapping data storage unit 114, an association analyzing unit 115, and an association analysis information storage unit 116.

The matrix generation unit 111 generates a matrix for use as input data of application analysis, from a power waveform and trace log data collected by actually executing applications on the target device. The following description assumes that Java is used as the application development language. For execution on the target device, particular applications may be selected from among those provided in the standard libraries of Java (e.g., graphics and view libraries). The matrix generation unit 111 stores the produced matrix in the matrix storage unit 112.

FIG. 4 gives an example of an execution trace log. The illustrated execution trace log 201 is formed from three data fields titled "Time," "Action," and "Method." The data values horizontally arranged in FIG. 4 are associated with each other to constitute a single log record. The time field indicates the time (msec) elapsed since the program is started. The action field indicates whether the recorded event is the start of a method or the end of a method. The method field indicates which method was started or ended at the recorded time.

FIG. 5 gives an example of a current measurement log. The illustrated current measurement log 202 is a collection of electric current values observed after the start of a program, with a time resolution of one second.

FIG. 6 gives an example of a matrix produced by the matrix generation unit 111. This matrix 112a is a collection of data values in the comma-separated values (CSV) format. Each row of the illustrated matrix 112a is formed from a series of values representing the time, Pt (power consumption), and methods in that order. That is, a row indicates what methods were being called at a particular time and how much power was consumed as a consequence of execution of those methods.

Pt values seen in this matrix 112a represent, not the amount of power consumption per se, but whether the power consumption exceeded a certain threshold or not. FIG. 6 emphasizes Pt values by enclosing them with a rectangular frame. Pt takes a value of one in the case where the power consumption exceeds a threshold of, for example, 888 [μWs] designated by the design engineer.

The amount of power may be calculated from an execution trace log 201 and a current measurement log 202. Referring to, for example, the execution trace log 201 in FIG. 4, method A started at 10 [msec] and ended at 11 [msec], where timestamps are relative to the start of the program. Since the observed current consumption in that 1-msec period is 120 [mA], the power consumption of method A in FIG. 6 is calculated as 120 [mA]×3.7 [V]×1 [msec]=444 [μWs], assuming that the supply voltage is 3.7 [V]. For another example, the power consumption of method B in FIG. 6 is calculated as 130 [mA]×3.7 [V]×3 [msec]=1443 [μWs].

The code-to-method mapping unit 113 uses the above-described matrix 112a to produce code-to-method mapping data that indicates which source code portions are associated with which methods. The code-to-method mapping unit 113 stores the produced code-to-method mapping data in the code-to-method mapping data storage unit 114.

FIG. 7 gives an example of such code-to-method mapping data. The illustrated code-to-method mapping table 114a contains a plurality of entries each associating one piece of source code with one or more methods.

With a specific power value designated by the design engineer, the association analyzing unit 115 executes association analysis by using the foregoing matrix 112a as the input, thus producing association analysis information that describes how the electric current consumption is associated with individual methods or combinations of methods. This specification will not discuss the detailed method of association analysis because the person skilled in the art can implement it with their knowledge.

FIG. 8 illustrates an exemplary result of association analysis. The illustrated association analysis result 115a is formed from five data fields titled as follows: "lhs," "rhs," "support," "confidence," and "lift."

The lhs and rhs fields respectively represent the left-hand side and right-hand side of an association rule, which are referred to as the "antecedent" and "consequence" in the terminology of association analysis. The support field indicates the probability that the association rule actually occurs. The confidence field indicates the probability that the association rule holds true when that rule occurs. The lift field indicates the ratio of improvement relative to the original probability. This improvement ratio is a factor related to increase of power consumption.

An example of how to evaluate an analysis result will now be described below with reference to FIG. 9. FIG. 9 gives an example of a summarized result of association analysis. The illustrated table T1 is an exemplary analysis result in the case where an excessive power consumption is observed during a time period in which the trace log records the execution of a specific combination of methods "[A]→[B]". The notation of method combination "[A]→[B]" means that there is an association rule between the execution of method A and the execution of method B.

For example, the topmost record of table T1 indicates that the combination of methods "[A]→[B]" consumes more than 1036 [μWs] at the probability of 40%, and that the improvement ratio in this case is 1.1, relative to the case in which the two methods A and B are executed separately. The improvement ratio takes a value of 1.0 when two methods are executed separately. An improvement ratio greater than 1.0 means that the combination in question is effective in reducing power consumption.

FIGS. 10A to 10C illustrate three examples of association analysis information. Association analysis information describes a series of method combinations having high improvement ratios, the combinations being arranged in descending order of the improvement ratio. One set of association analysis information is provided for each target level of electric power consumption. The design engineer may designate these target levels of electric power consumption.

The illustrated three sets of association analysis information 115b, 115c, and 115d are respectively applicable to electric power consumption of 888, 962, and 1036 [μWs]. For example, the first association analysis information 115b indicates that an improvement ratio of 1.4 can be achieved by executing the methods of "[android.graphics.CanvassetDensity . . . I.V]→[android.graphics.CanvasisOpaque . . . Z]" in combination, rather than executing these methods individually. The association analyzing unit 115 actually produces many such pieces of association analysis information on the order of, for example, tens of thousands to hundreds of thousands.

The power tendency data generation unit 12 produces power tendency data as a collection of records with the highest improvement ratio for each different level of electric power consumption. The power tendency data generation unit 12 compiles this power tendency data by extracting such records from the association analysis information stored in the association analysis information storage unit 116. The power tendency data generation unit stores the power tendency data in the power tendency data storage unit 13 as it is produced. This power tendency data is an example of analysis information.

FIG. 11 gives an example of power tendency data. The illustrated power tendency table 13a is formed from data fields with the following titles: "Index," "Method Pattern," "Power Consumption," "Power Tendency," and "Improvement Ratio." The data values horizontally arranged in this power tendency table 13a are associated with each other and thus constitute a single record.

The index field of each record in the power tendency table 13a contains a unique number for identifying the record. The method pattern, power tendency, and improvement ratio fields contain what are stored in their counter parts in the foregoing association analysis information. The power consumption field contains a value of electric power consumption associated with the source data from which the record has been extracted.

Referring again to FIG. 3, the software improvement data generation unit 14 produces software improvement data by searching past records of revisions (changes) made by the design engineer and collecting source codes that achieved a higher improvement ratio. When a revised source code exhibits an increase in the improvement ratio, it means that the source code is effective in power reduction. This software improvement data aids the designer to come up with an idea for improving his or her software programs. The software improvement data generation unit 14 stores such software improvement data in the software improvement data storage unit 15 as it is produced.

FIG. 12 gives an example of software improvement data. The illustrated software improvement table 15a of FIG. 12 is formed from three data fields titled as follows: "Source Code," "Method," and "Improvement Ratio." The data values horizontally arranged in this software improvement table 15a are associated with each other and thus constitute a single record. The source code and method fields contain what is stored in their counterparts in the foregoing code-to-method mapping table 114a. The improvement ratio field contains an improvement ratio that is copied from the power tendency table 13a for the method(s) seen in the method fields.

The application developing unit 16 is a set of development tool functions. For example, the design engineer may run a software tool for development of Android (registered trademark) applications, whose functions serve as the application developing unit 16. Specifically, the application developing unit 16 displays a development environment window on a screen of the monitor 104a for use by the design engineer to write a software program. The displayed window allows the design engineer to designate a specific electric power consumption (hereafter "target power consumption"). Upon receipt of this input, the application developing unit 16 consults the power tendency table 13a to find records whose power consumption field matches with the designated target power consumption. When such records are found, the application developing unit 16 then looks into the power tendency field of these records to compare the field values with a certain threshold (e.g., 0.8). The application developing unit 16 determines whether the program under development includes method combinations described in the records has a high power tendency that is greater than or equal to the threshold. These method combinations are likely to exceed the target power consumption when they are executed as part of the program under development. The application developing unit 16 now emphasizes particular portions of source code that include such method combinations, in a manner distinguishable from other portions of the source code. For example, a pop-up balloon may be added to each emphasized portion of the source code. The application developing unit 16 may be configured to indicate the power tendency of each method in the source code, with reference to the power tendency table 13a.

FIG. 13A illustrates an exemplary screen produced by the application developing unit 16 according to the second embodiment. The illustrated development environment window 161 is an example of what the design engineer sees on his or her monitor 104a during the development process. The application developing unit 16 displays a source code portion 162 including methods that are likely to exceed the target power consumption when they are executed, in a manner distinguishable from other portions of the source code. As can be seen in FIG. 13A, the source code portion 162 is enclosed by a broken-line frame, with a pop-up balloon that reads "HIGH."

The pop-up balloon prompts the design engineer to revise the source code portion in question. The analyzing unit 11 performs association analysis again, now with the methods used in the revised code. The power tendency data generation unit 12 updates the power tendency table 13a to reflect the result of this additional association analysis. Similarly the software improvement data generation unit 14 updates its software improvement table 15a with the analysis result, as illustrated in FIG. 13B. Using the updated software improvement table 15a, the application developing unit 16 indicates in the development environment window 161 a new improvement ratio achieved by the revising of source code.

Figure 14:
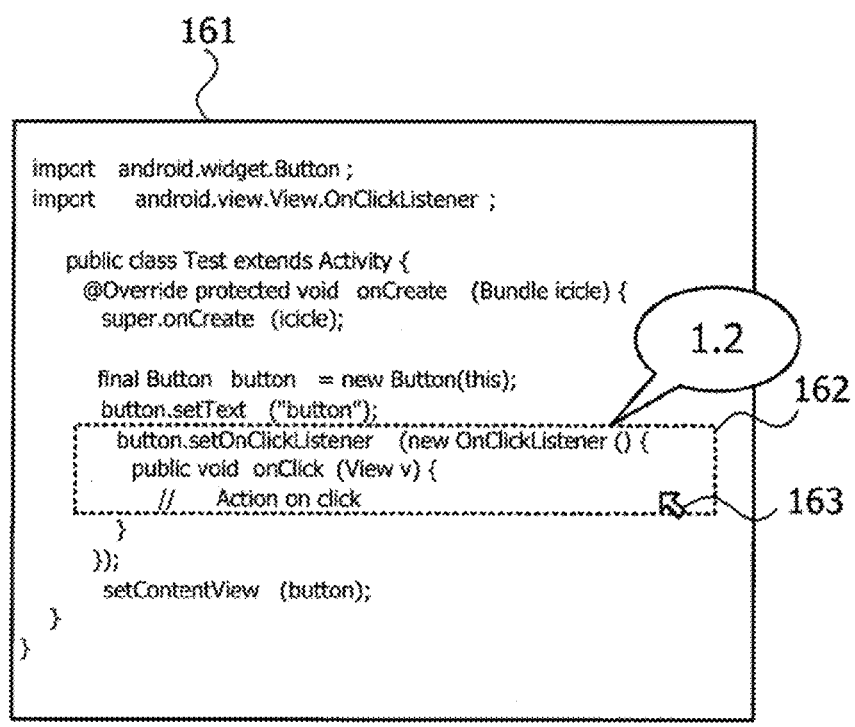
FIG. 14 illustrates another exemplary screen produced by the application developing unit according to the second embodiment.

FIG. 14 illustrates another exemplary window produced by the application developing unit according to the second embodiment. When the mouse cursor 163 hovers over a source code portion 162 indicated by the broken-line frame in FIG. 14, the application developing unit 16 produces a pop-up balloon to notify the design engineer of the improvement ratio of 1.2. The application developing unit 16 has retrieved this value from the software improvement table 15a.

With the above processing of the application developing unit 16, the design engineer recognizes that the source code that he or she has just changed reduces power consumption. It is noted that the pop-up balloon is not limited by the specific example discussed above, but may contain other kind of information. For example, the application developing unit 16 may produce a pop-up balloon that indicates how much the improvement ratio increases or decreases as a result of the source code change. Other kinds of indication may be used to represent an increase or decrease of improvement ratios.

The design engineer checks the software improvement table 15a to see whether any method combinations described therein may be applied to his or her source code for better results. When such a method combination is found and applied, the changed source code is expected to reduce the amount of power consumption.

After making one or more such changes to his or her source code, the design engineer runs the developed software application on a target product for the purpose of prototype testing, thus collecting an execution trace log 201 and current measurement log 202. The collected execution trace log 201 and current measurement log 202 are then loaded into the design-aiding apparatus 10. The power tendency table 13a in the base station 100 is updated by the analyzing unit 11 and power tendency data generation unit 12. The design engineer repeats revising the source code and executing association analysis, thereby creating a power tendency table 13a dedicated to the application under development.

Figure 15:
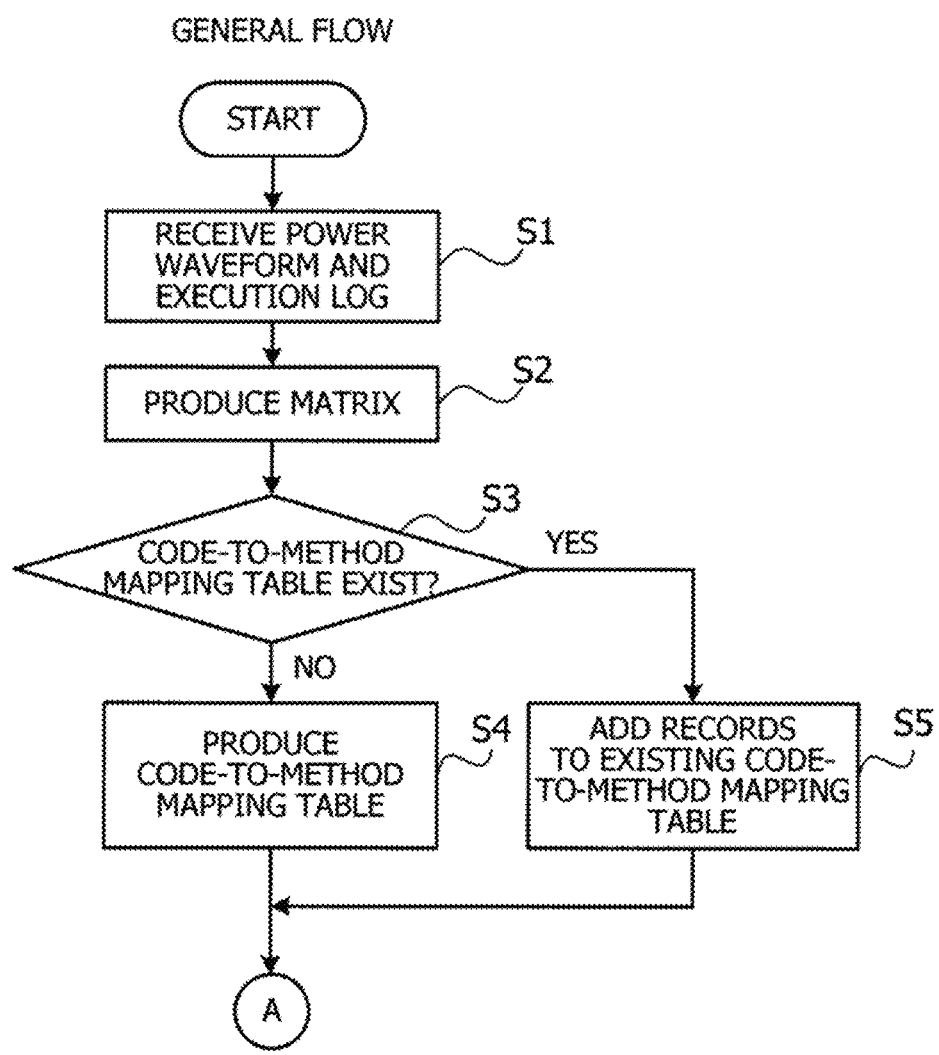
FIGS. 15 and 16 are a flowchart of a general processing flow of a design-aiding apparatus.
Figure 16:
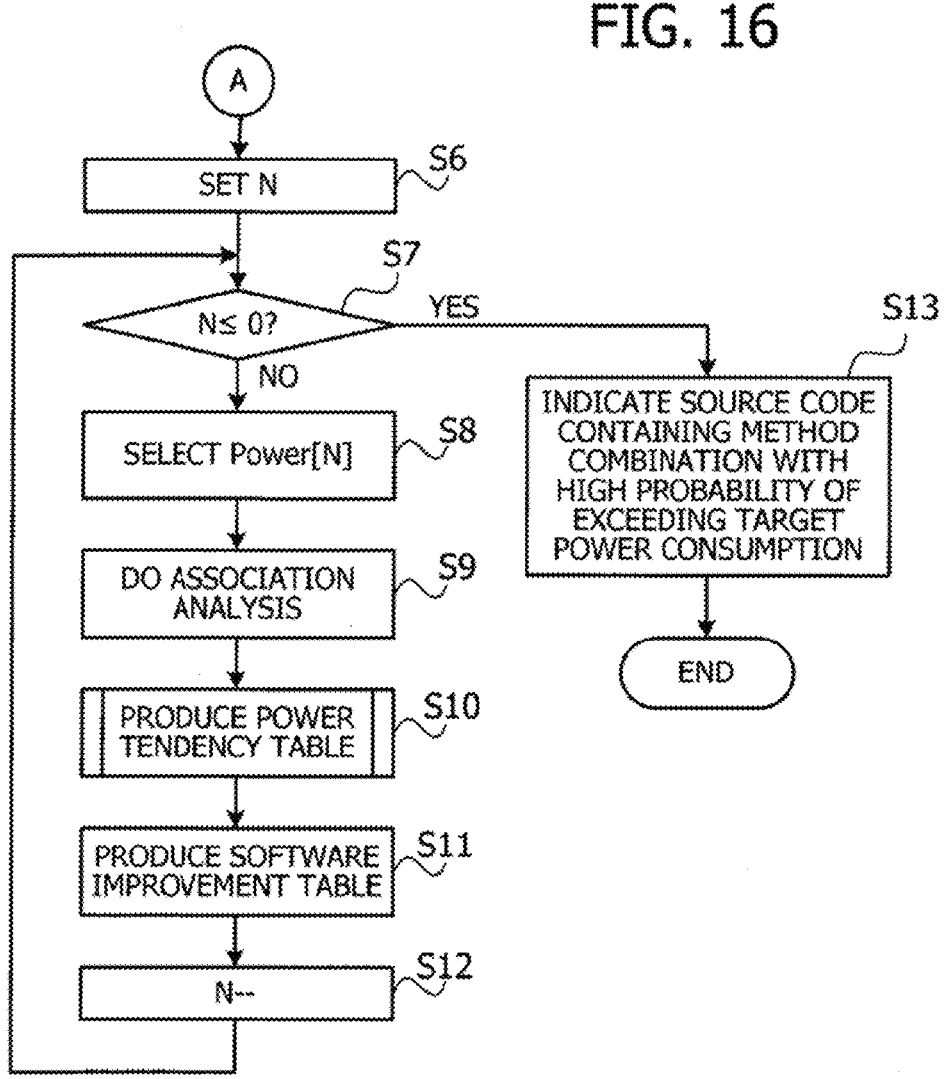

The operation of the above design-aiding apparatus 10 as a whole will now be described below. FIGS. 15 and 16 are a flowchart of a general processing flow of the design-aiding apparatus 10. Each step of this flowchart will now be described below in the order of step numbers.

(Step S1) When the design engineer selects and runs an application, an execution trace log 201 and a current measurement log 202 are collected. The matrix generation unit 111 receives these log records and then proceeds to step S2.

(Step S2) The matrix generation unit 111 produces a matrix 112a and advances the process to step S3.

(Step S3) The code-to-method mapping unit 113 determines whether there is a code-to-method mapping table 114a in the code-to-method mapping data storage unit 114. When an existing code-to-method mapping table 114a is found in the code-to-method mapping data storage unit 114 (Yes at step S3), the code-to-method mapping unit 113 proceeds to step S5. When no existing table is found (No at step S3), it proceeds to step S4.

(Step S4) The code-to-method mapping unit 113 produces a code-to-method mapping table 114a that describes combinations of source codes and methods in the execution trace log 201 received at step S1. The produced code-to-method mapping table 114a is then stored into the code-to-method mapping data storage unit 114. The code-to-method mapping unit 113 then proceeds to step S6 in FIG. 16.

(Step S5) Now that new records of code-method combinations are obtained at step S3, the code-to-method mapping unit 113 appends each combination to the code-to-method mapping table 114a. The code-to-method mapping unit 113 then advances the process to step S6 in FIG. 16.

(Step S6) The analyzing unit 11 sets a variable N (N≥0) representing the number of power consumption values to be subjected to association analysis. For example, N is set to three when there are three values of power consumption, 888, 962, and 1036 [μWs] for association analysis. The analyzing unit 11 then proceeds to step S7.

(Step S7) The analyzing unit 11 compares N with zero. If N≤0 (Yes at step S7), the analyzing unit 11 makes the process branches to step S13. If N>0 (No at step S7), the analyzing unit 11 proceeds to step S8.

(Step S8) The association analyzing unit 115 selects one power consumption value Power[N] out of the N values for association analysis. The association analyzing unit 115 then proceeds to step S9.

(Step S9) The association analyzing unit 115 executes association analysis with the value of power consumption that has been selected at step S8 and outputs the result as association analysis information. The produced association analysis information is then stored in the association analysis information storage unit 116. The association analyzing unit 115 then advances the process to step S10.

(Step S10) The power tendency data generation unit 12 produces a power tendency table 13a from the association analysis information stored in the association analysis information storage unit 116 and stores it in the power tendency data storage unit 13. The power tendency data generation unit 12 then advances the process to step S11. Details of step S10 will be described later.

(Step S11) The software improvement data generation unit 14 produces a software improvement table 15a from the power tendency table 13a stored in the power tendency data storage unit 13. More specifically, the software improvement data generation unit 14 retrieves one record from the power tendency table 13a. This record contains a specific pattern of methods. The software improvement data generation unit 14 retrieves a source code portion corresponding to these methods from the code-to-method mapping table 114a. The software improvement data generation unit 14 then produces a record for the software improvement table 15a by associating the obtained source code portion with the obtained methods and their improvement ratio. The software improvement data generation unit 14 repeats this as many times as the number of records in the power tendency table 13a, thus populating the software improvement table 15a. The software improvement data generation unit 14 then advances the process to step S12.

(Step S12) The analyzing unit 11 decrements N by one and goes back to step S7.

(Step S13) The application developing unit 16 checks the power consumption field of the power tendency table 13a to find a record that matches with the specified target power consumption. When such a record is found, the application developing unit 16 then reads the power tendency field of that record. When the value of power tendency has a particular magnitude (e.g., 0.8) or more, the application developing unit 16a determines whether the program under development contains a combination of methods described in that record. If the program uses such methods as part of its source code, it means that the program is likely to cause the power consumption to exceed the specified target power consumption. The application developing unit 16 thus emphasizes that portion of the source code in a manner distinguishable from other portions of the source code. The application developing unit 16 also adds a pop-up balloon to that portion of the source code. This is the end of the general process flow of FIG. 16.

While not detailed in the above flowchart of FIG. 16, step S10 produces a power tendency table 13a. The next section will now discuss in detail the process of producing a power tendency table.

Figure 17:
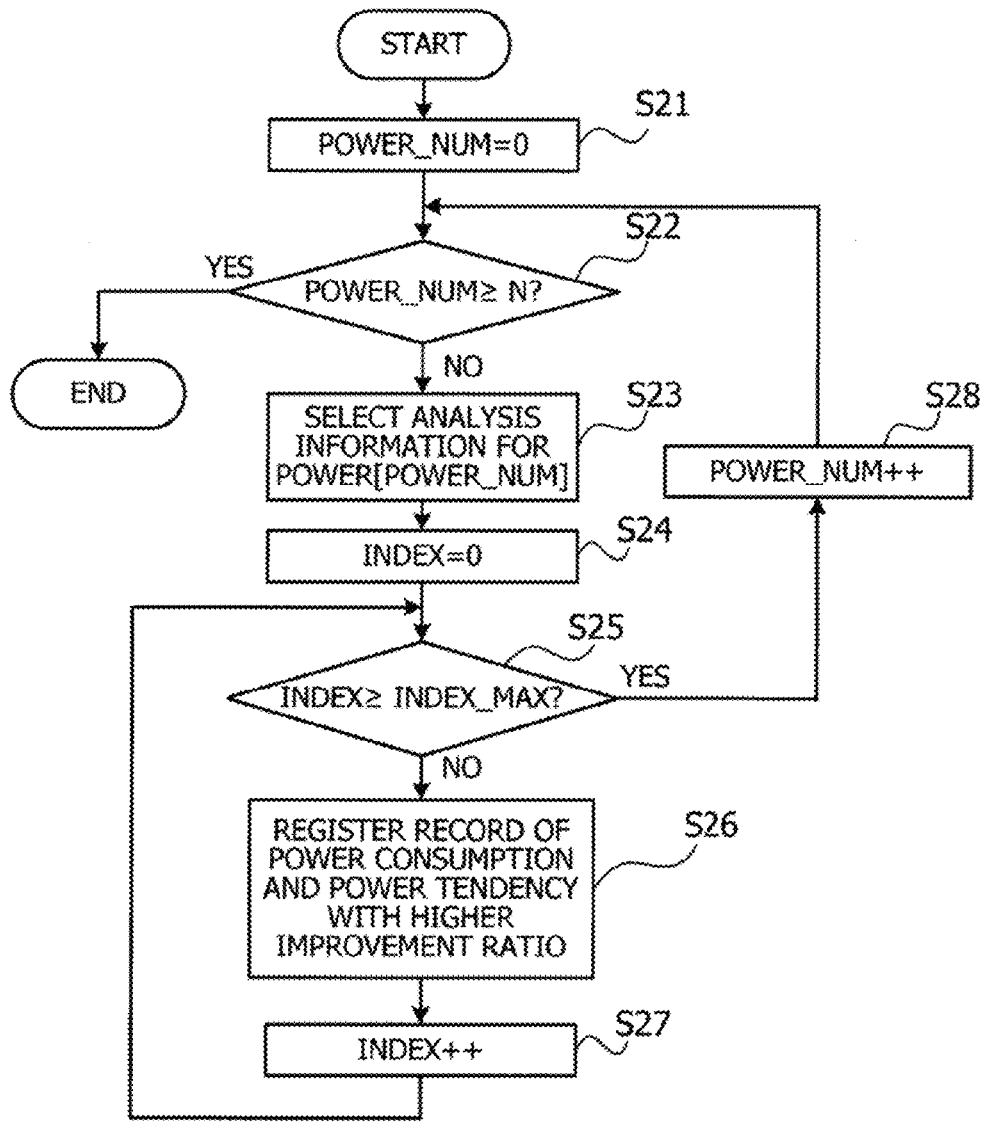
FIG. 17 is a flowchart illustrating a process of producing a power tendency table.

FIG. 17 is a flowchart illustrating a process of producing a power tendency table. Each step in FIG. 17 will now be described below in the order of step numbers.

(Step S21) The power tendency data generation unit 12 sets a variable POWER_NUM to zero, which is used to identify specific records of association analysis information among those produced at step S9 of FIG. 16. The power tendency data generation unit 12 then proceeds to step S22.

(Step S22) The power tendency data generation unit 12 determines whether POWER_NUM has reached N (the number of power consumption values designated for the association analysis). If POWER_NUM is N or more (Yes at step S22), then the power tendency data generation unit 12 exits from the process of FIG. 17. If POWER_NUM is smaller than N (No at step S22), the power tendency data generation unit 12 proceeds to step S23.

(Step S23) The power tendency data generation unit 12 selects association analysis information relevant to the power consumption value indexed by POWER_NUM and then proceeds to step S24.

(Step S24) The records constituting the association analysis information selected at step S23 are to be indexed by a parameter INDEX. The power tendency data generation unit 12 initializes this parameter INDEX to zero and then proceeds to step S25.

(Step S25) The power tendency data generation unit 12 determines whether parameter INDEX is greater than INDEX_MAX (the maximum number for INDEX). If parameter INDEX exceeds its upper limit INDEX_MAX (Yes at step S25), the power tendency data generation unit 12 proceeds to step S28. If parameter INDEX is within the upper limit INDEX_MAX (No at step S25), the power tendency data generation unit 12 proceeds to step S26.

(Step S26) The power tendency data generation unit 12 compares the improvement ratio currently stored in the power tendency table 13a with the improvement ratio corresponding to parameter INDEX in the selected association analysis information. If the latter value is higher than the former value, the power tendency data generation unit 12 overwrites the current record in the power tendency table 13a with the record indexed by INDEX in the association analysis information, thus updating the power tendency table 13a. The power tendency data generation unit 12 then proceeds to step S27.

(Step S27) The power tendency data generation unit 12 increments parameter INDEX by one and then goes back to step S25 to execute subsequent steps.

(Step S28) The power tendency data generation unit 12 increments POWER_NUMBER by one and then goes back to step S22 to execute subsequent steps.

The process of producing a power tendency table has been described above. The next section will now describe what the proposed design-aiding apparatus 10 performs in response to a change that the design engineer makes to his or her source code. This operation is referred to as a source code revision process.

Figure 18:
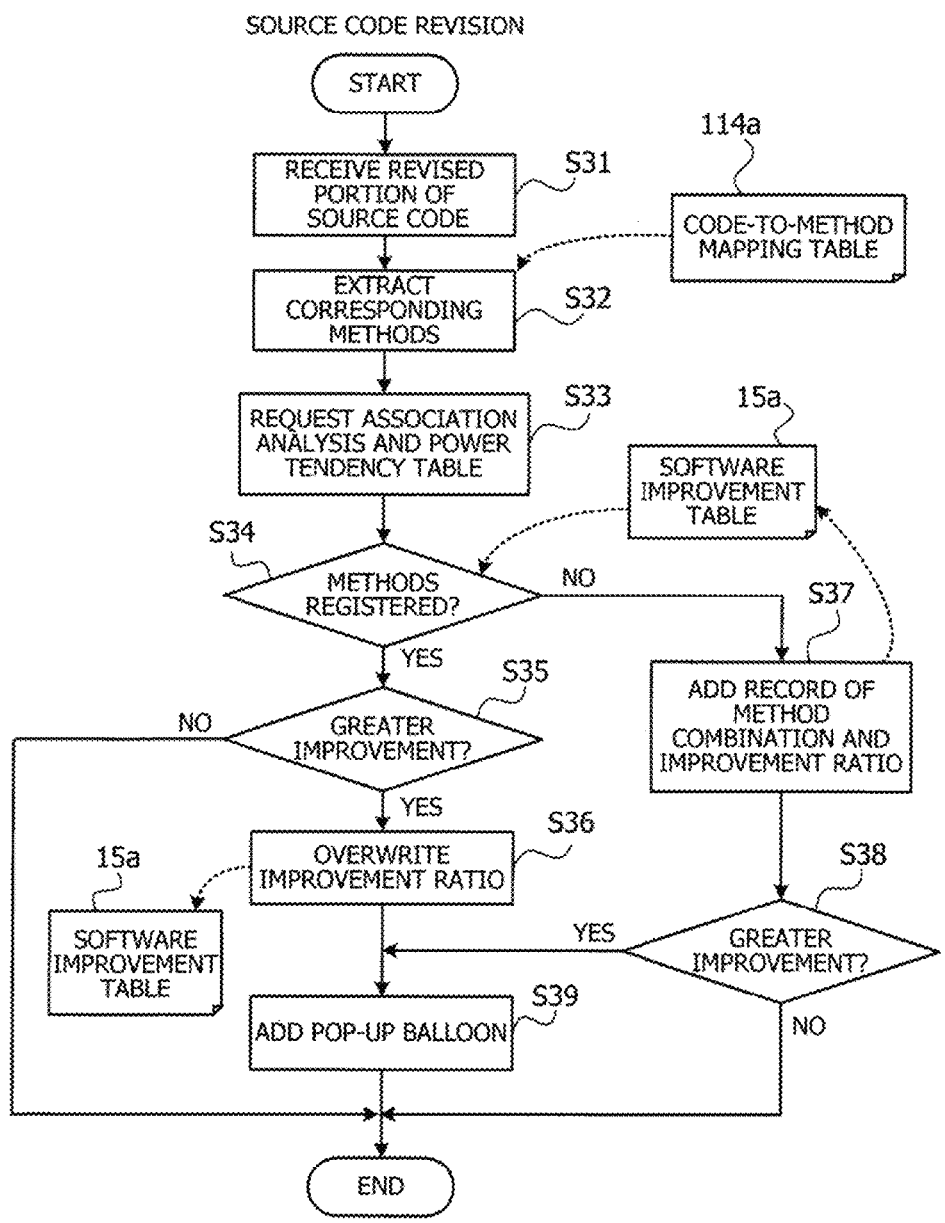
FIG. 18 is a flowchart illustrating a process of rewriting source code.

FIG. 18 is a flowchart illustrating a source code revision process. Each step in FIG. 18 will now be described below in the order of step numbers.

(Step S31) The software improvement data generation unit 14 receives input of a source code portion that the design engineer has revised. The software improvement data generation unit 14 then proceeds to step S32.

(Step S32) With reference to the code-to-method mapping table 114a, the software improvement data generation unit 14 extracts methods that are associated with the source code portion received at step S31 and then proceeds to step S33.

(Step S33) The software improvement data generation unit 14 requests the association analyzing unit 115 to execute association analysis again for the methods extracted at step S32. The software improvement data generation unit 14 also requests the power tendency data generation unit 12 to produce a power tendency table 13a from outcomes of this additional association analysis. The software improvement data generation unit 14 then proceeds to step S34.

(Step S34) The resulting power tendency table 13a has a record containing a new combination of methods in its method pattern field. The software improvement data generation unit 14 determines whether this combination of methods is already registered in the software improvement table 15a. If the method combination in question is found in the software improvement table 15a (Yes at step S34), the software improvement data generation unit 14 proceeds to step S35. If the method combination in question is not found in the software improvement table 15a (No at step S34), the software improvement data generation unit 14 advances to step S37.

(Step S35) Now the power tendency table 13a and software improvement table 15a are found to have records with the same method combination in their method pattern fields. These records, however, may contain different improvement ratios. The software improvement data generation unit 14 compares the two improvement ratios, thus determining which table has a greater value of improvement ratio. If the power tendency table 13a is found to have a greater improvement ratio than the software improvement table 15a (Yes at step S35), the software improvement data generation unit 14 proceeds to step S36. If the power tendency table 13a is found not to have a greater improvement ratio than the software improvement table 15a for the method combination (No at step S35), the software improvement data generation unit 14 terminates the process of FIG. 18.

(Step S36) The software improvement data generation unit 14 overwrites the current improvement ratio in the software improvement table 15a with the greater improvement ratio seen in the power tendency table 13a. The software improvement data generation unit 14 then advances the process to step S39.

(Step S37) The software improvement data generation unit 14 adds a new record to the software improvement table 15a. This record associates the source code received at step S31 with the method combination and improvement ratio newly added to the power tendency table 13a.

(Step S38) As a result of the addition of a record at step S37, both the software improvement table 15a and power tendency table 13a have records containing the same method combination in their method pattern field. These records, however, may contain different improvement ratios. The software improvement data generation unit 14 compares the two improvement ratios, thus determining which table has a greater value of improvement ratio. If the power tendency table 13a is found to have a greater improvement ratio than the software improvement table 15a for the method combination (Yes at step S38), the software improvement data generation unit 14 advances the process to step S39. If the power tendency table 13a is found not to have a greater improvement ratio than the software improvement table 15a for the method combination (No at step S38), the software improvement data generation unit 14 terminates the process of FIG. 18.

(Step S39) The application developing unit 16 generates a pop-up balloon for indicating the processing result of the revised portion of source code and attaches it to that source code portion on the display screen. The process of source code revision is then completed.

As can be seen from the above description, the proposed design-aiding apparatus 10 is designed to perform association analysis of various combinations of methods and produce a power tendency table 13a by calculating probabilities of how much each method combination would contribute to increase of power consumption. This feature of the second embodiment is advantageous over the conventional power modeling with linear approximation since the embodiment eliminates the need for executing a plurality of applications many times, and thus enables quick estimation of power consumption even for a partially implemented application. The design engineer checks improvement ratios of power consumption in a realtime fashion each time he or she revises the source code. By doing so, they can determine how much increase or decrease of power consumption is expected when a different combination of methods is used.

As the source data for producing a power tendency table 13a, the design-aiding apparatus 10 uses an execution trace log 201 and current measurement log 202, rather than measuring power consumption of the target product by running individual portions of the program. The use of such log records makes it possible to estimate the power consumption without too much effort.

It is not always easy, however, for design engineers to figure out what kind of source code will effectively reduce the power consumption of their applications. The following third embodiment is directed a design-aiding apparatus that helps the user to make a right choice of source code combinations for reducing power consumption of the application under development.

(c) Third Embodiment

This section describes a design-aiding apparatus according to a third embodiment. As the third embodiment shares some elements and features with the foregoing second embodiment, the following description focuses on their differences and relies on the previous sections for similar elements and features.

Figure 19:
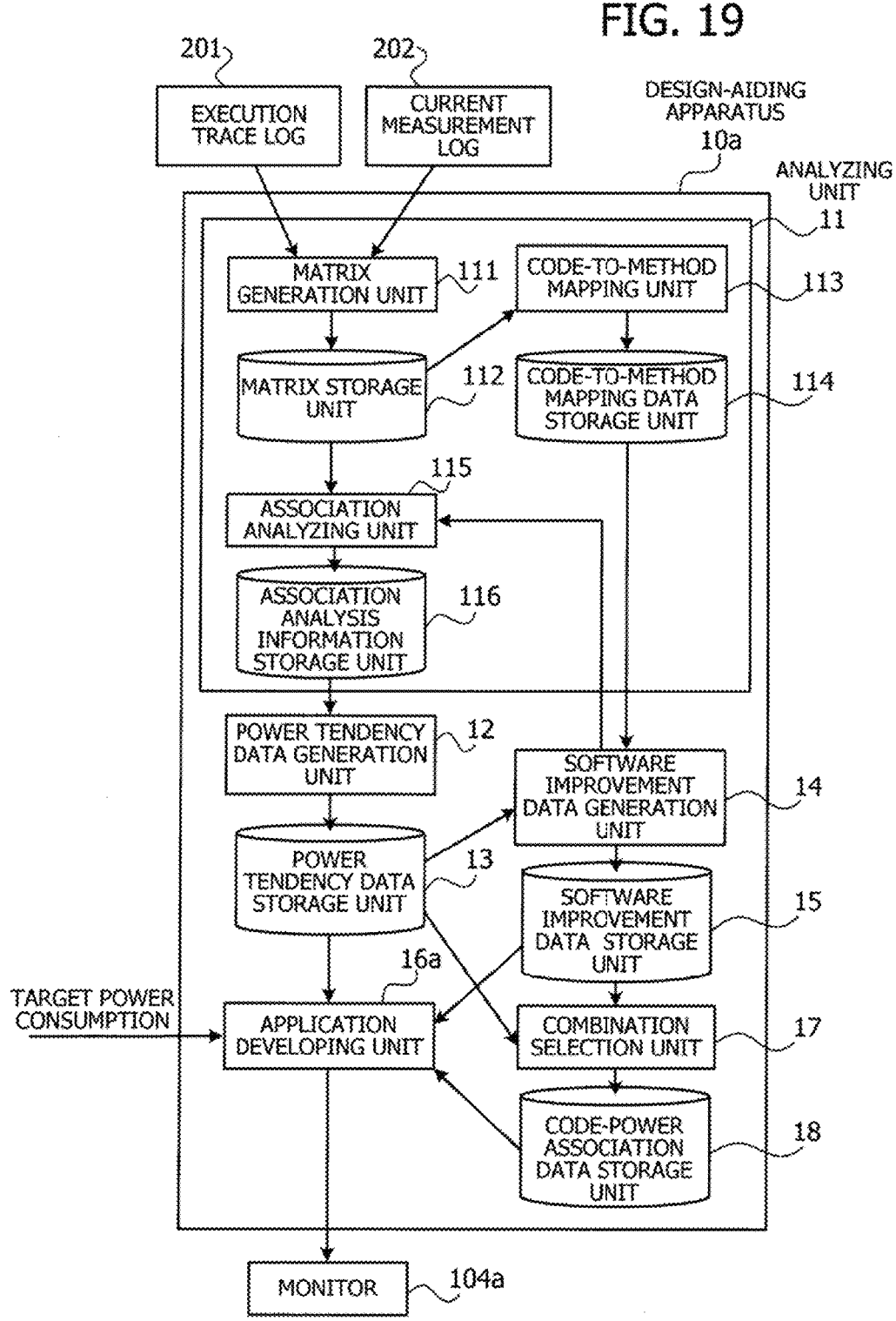
FIG. 19 is a functional block diagram of a design-aiding apparatus according to a third embodiment.

FIG. 19 is a functional block diagram of a design-aiding apparatus according to the third embodiment. The illustrated design-aiding apparatus 10a of the third embodiment includes a combination selection unit 17 and a code-power association data storage unit 18 in addition to the components discussed previously in FIG. 3.

The combination selection unit 17 searches the software improvement table 15a for source code combinations that will help the design engineer to reduce the power consumption of his or her application. More specifically, the combination selection unit 17 produces code-power association data that associates power consumption values with the software improvement table 15a, so that the source code, power consumption, and improvement ratio are compiled into a single collection of data. The combination selection unit 17 stores such code-power association data in the code-power association data storage unit 18.

FIG. 20 gives an example of code-power association data. The illustrated code-power association table 18a associates methods (seen as "Code-revision-associated Method" in FIG. 20), power consumption, and improvement ratios with each other, where the methods correspond to a source code portion revised by the design engineer. For example, the first and second records of this code-power association table 18a have been produced from a software improvement table 15a for power consumption 888 [µWs]. The fourth record has been produced from another software improvement table 15a for power consumption 962 [µWs]. The fifth record presents values of power consumption and improvement ratio in the case where the source code is revised to apply the third and fourth records.

The combination selection unit 17 compares these records with each other. Suppose, for example, the combination selection unit 17 now compares the fifth record with the third and fourth records. This comparison suggests that the program, if revised with the code-revision-associated methods described in the fifth record, would achieve a lower power consumption (i.e., 962>888), although its improvement ratio is not better than in the case of the third record alone (i.e., 1.8>1.5). Accordingly the combination selection unit 17 determines that applying the fifth record is advantageous in terms of power consumption.

The combination selection unit 17 finds source code combinations by searching software improvement tables 15a in the above way. The application developing unit 16a now displays these source code combinations on the monitor 104a.

Figure 21:
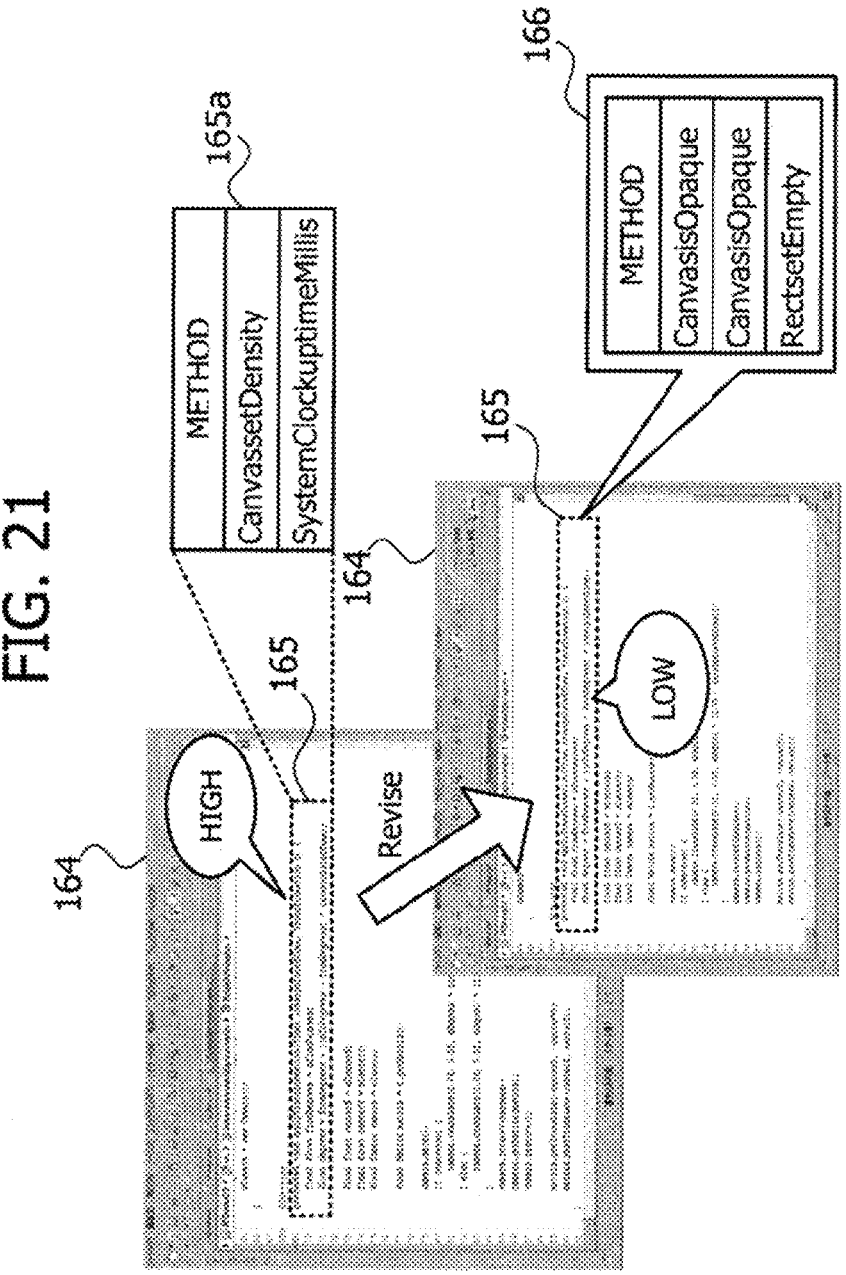
FIG. 21 illustrates an exemplary screen produced by an application developing unit according to the third embodiment.

FIG. 21 illustrates an exemplary screen produced by the application developing unit 16a according to the third embodiment. The illustrated development environment window 164 is an example of what the design engineer sees on his or her monitor 104a during the development process. The application developing unit 16a displays a pop-up balloon at a source code portion 165 including methods that are likely to exceed the target power consumption when they are executed. In the example of FIG. 21, the source code portion 165 is enclosed by a broken-line frame, with a pop-up balloon that reads "HIGH." FIG. 21 also enlarges methods 165a contained in the source code portion 165.

Suppose now that the design engineer has revised the source code portion 165. In response, the combination selection unit 17 requests the association analyzing unit 115 and power tendency data generation unit 12 to re-calculate power consumption of the revised source code. When the calculation result is returned, the combination selection unit 17 then updates the code-power association table 18a with the obtained value of power consumption.

Also in response to the source code revision by the design engineer, the combination selection unit 17 consults the code-power association table 18a to select some code-revision-associated methods that will probably reduce the power consumption. The application developing unit 16a places a balloon 166 associated with the source code portion 165 on the monitor 104a to propose alternative methods for that portion. This feature permits the design engineer to learn which code-revision-associated methods are likely to reduce power consumption.

Figure 22:
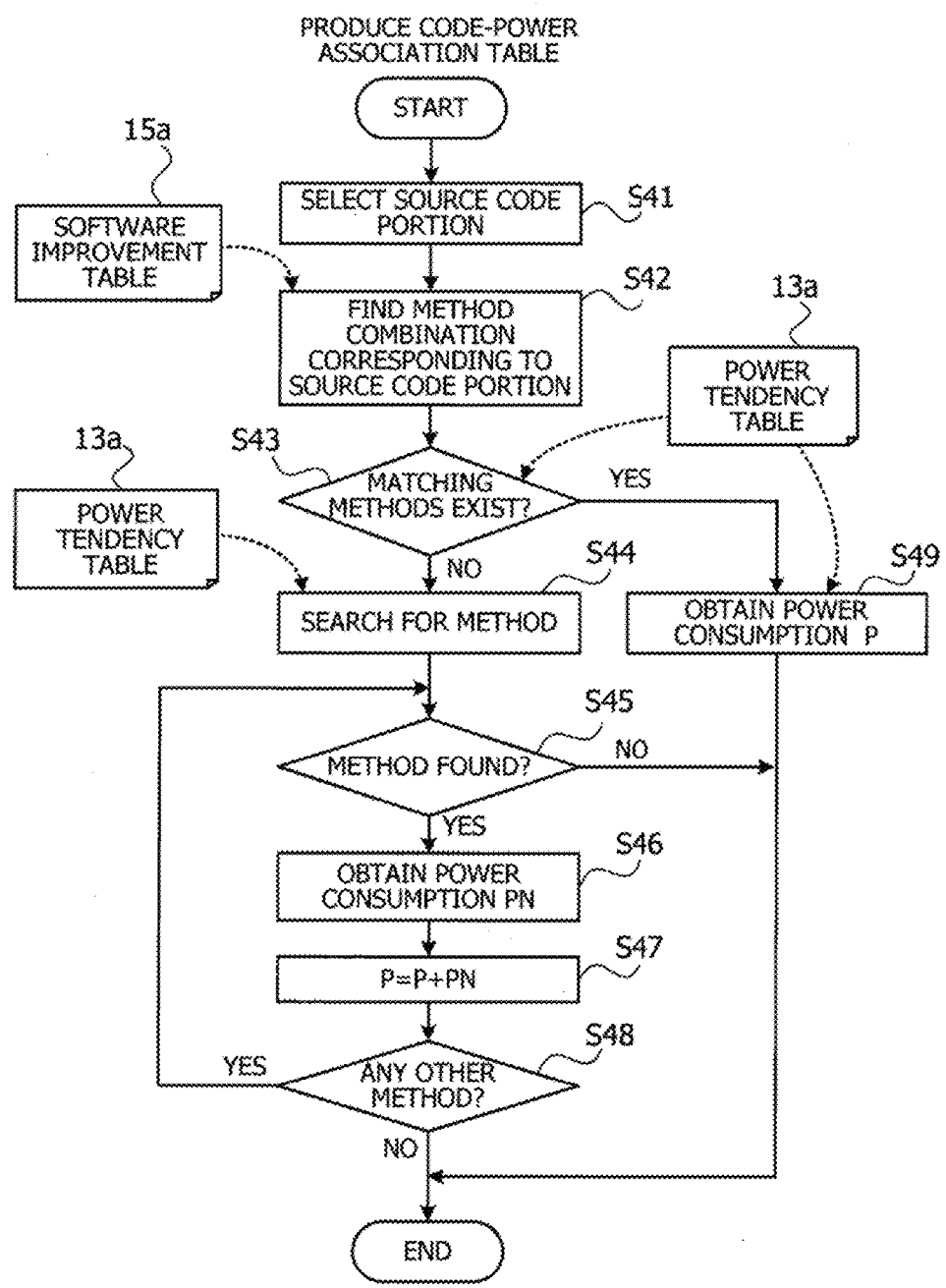
FIG. 22 is a flowchart illustrating a process of producing a code-power association table.

The detailed operation of the combination selection unit 17 will now be described below with reference to several flowcharts. To begin with, the description is directed to a process of producing a code-power association table 18*a*. FIG. 22 is a flowchart illustrating a process of producing code-power association table. Each step in FIG. 22 will now be described below in the order of step numbers.

(Step S41) The combination selection unit 17 finds which portion of the source code has been revised by the design engineer and selects it for the subsequent extraction of power consumption values. The combination selection unit 17 then proceeds to step S42.

(Step S42) With reference to the software improvement table 15*a*, the combination selection unit 17 identifies a combination of methods corresponding to the source code portion selected at step S41 and proceeds to step S43.

(Step S43) With reference to the method pattern field of the power tendency table 13*a*, the combination selection unit 17 determines whether the power tendency table 13*a* contains an existing record that matches with the combination of methods identified at step S42. If the power tendency table 13*a* has such a record (Yes at step S43), the combination selection unit 17 proceeds to step S49. If no such records are found in the power tendency table 13*a* (No at step S43), it proceeds to step S44.

(Step S44) The combination selection unit 17 selects one method out of the combination of methods identified at step S42 and searches the power tendency table 13*a* for the select method. The combination selection unit 17 proceeds to step S45.

(Step S45) The combination selection unit 17 determines whether the power tendency table 13*a* contains a record that matches with the method selected at step S44. If the power tendency table 13*a* contains such a record (Yes at step S45), the combination selection unit 17 proceeds to step S46. If no such record is found in the power tendency table 13*a* (No at step S45), the present process of FIG. 22 is terminated.

(Step S46) The combination selection unit 17 obtains power consumption PN from the found record of the power tendency table 13*a* and then proceeds to step S47.

(Step S47) The combination selection unit 17 adds the obtained power consumption PN to power consumption P, thus updating the value of power consumption P. The combination selection unit 17 then proceeds to step S48.

(Step S48) The combination selection unit 17 determines whether the power tendency table 13*a* has any other methods that have not undergone the processing of steps S45 to S47. If such methods are found in the power tendency table 13*a* (Yes at step S48), the combination selection unit 17 goes back to step S45 and executes subsequent steps with those remaining methods. If no such method remains in the power tendency table 13*a* (No at step S48), the present process of FIG. 22 is terminated.

(Step S49) The combination selection unit 17 obtains power consumption P from the record whose method pattern field matches with the found method combination. The present process of FIG. 22 is then terminated.

As described above in FIG. 22, a power tendency table 13*a* is produced from the result of association analysis, and thus provides current values associated with a combination of methods or each individual method. Methods in the software improvement table 15*a* correspond to individual pieces of source code. Accordingly, the combination selection unit 17 retrieves a power consumption value from the power tendency table 13*a* when a combination of methods matches with a method pattern in the power tendency table 13*a*. When there is no matching method pattern in the power tendency table 13*a*, the combination selection unit 17 adds up the values of individual power consumption of methods.

FIG. 23 illustrates a specific example how a code-power association table is produced. Specifically, FIG. 23 illustrates a software improvement table 15*a* and a power tendency table 13*a* as the source data for a code-power association table 18*a*. The first record in the illustrated software improvement table 15*a* contains a combination of methods that matches with the method pattern of the first record in the power tendency table 13*a*. In this case, the combination selection unit 17 reads the power consumption field of the first record in the power tendency table 13*a* and sets that value of 962 [µWs] to a corresponding power consumption field of the code-power association table 18*a*.

On the other hand, the third record in the software improvement table 15*a* does not exactly match with any of the method patterns in the power tendency table 13*a*. The combination selection unit 17 therefore looks into the power tendency table 13*a* again and finds two individual methods in its second and fourth records, whose values of power consumption are 50 and 80 [µWs], respectively. The combination selection unit 17 calculates a sum of these two values, thereby obtaining a power consumption value for the code-power association table 18*a*.

Figure 24:
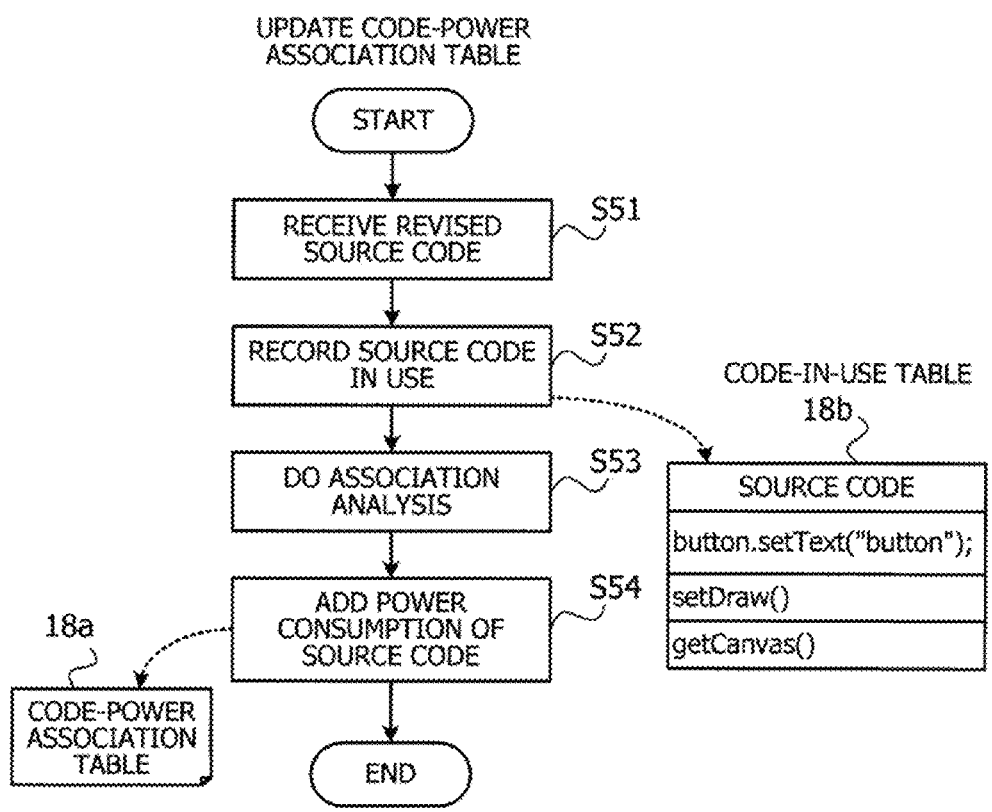
FIG. 24 is a flowchart illustrating a process of updating a code-power association table.

The combination selection unit 17 also updates the code-power association table 18*a* when source code is revised by the design engineer. FIG. 24 is a flowchart illustrating a process of updating a code-power association table. Each step in FIG. 24 will now be described below in the order of step numbers.

(Step S51) The combination selection unit 17 receives a source code portion revised by the design engineer and then proceeds to step S52.

(Step S52) The combination selection unit 17 stores the received source code portion in a code-in-use table 18*b* and then proceeds to step S53.

(Step S53) The combination selection unit 17 requests the association analyzing unit 115 to execute association analysis of the received source code portion. Upon completion of the association analysis, the combination selection unit 17 receives the result and proceeds to step S54.

(Step S54) The analysis result received from the association analyzing unit 115 contains a value of power consumption. The combination selection unit 17 updates the code-power association table 18*a* with a new record including this power consumption value, together with the source code portion received at step S51. The process of FIG. 24 is then terminated.

Figure 25:
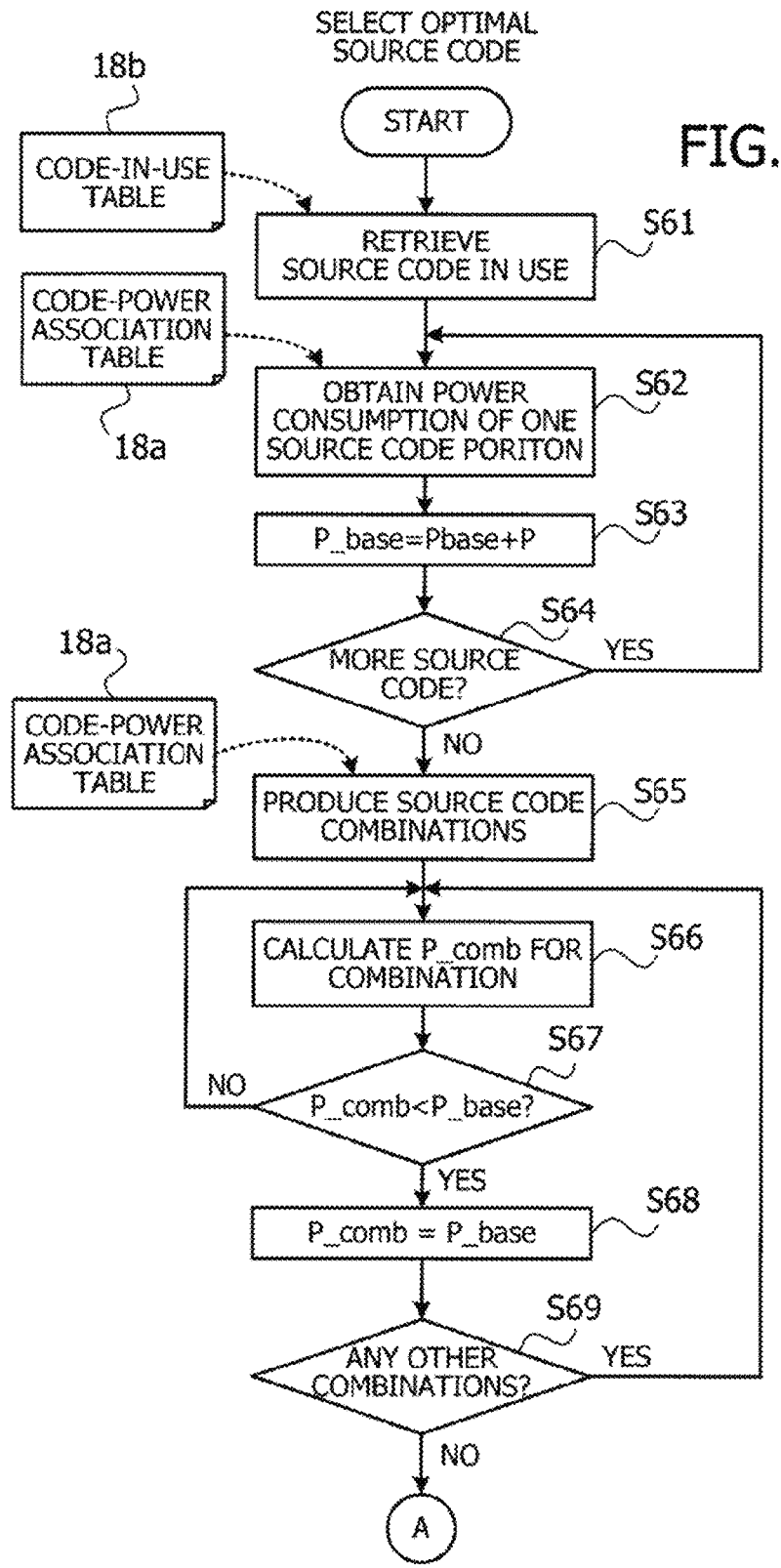
FIGS. 25 and 26 are a flowchart illustrating a process of selecting optimal source code.
Figure 26:
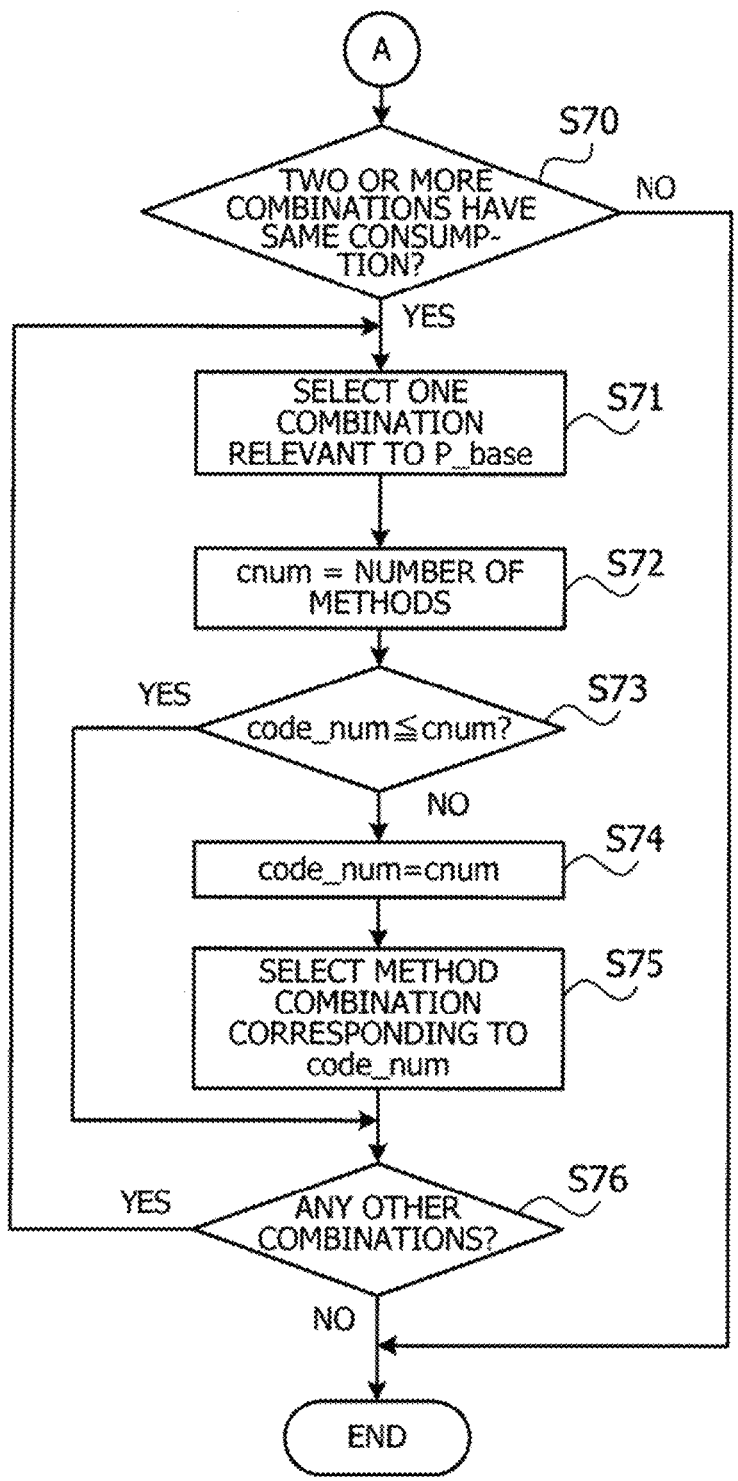

The combination selection unit 17 also performs optimal source code selection to propose some choices for alternative source code that is highly likely to reduce power consumption. FIGS. 25 and 26 are a flowchart illustrating how optimal source code is selected. Each step of this process will be described below in the order of step numbers.

(Step S61) The combination selection unit 17 retrieves every piece of source code collected in the code-in-use table 18*b* and then proceeds to step S62.

(Step S62) With reference to the code-power association table 18*a*, the combination selection unit 17 obtains power consumption P associated with one piece of revised source code and then proceeds to step S63.

(Step S63) The combination selection unit 17 adds the power consumption P obtained at step S62 to parameter P_base, which represents a cumulative total of power consumption of source code stored in the code-in-use table 18b. The combination selection unit 17 then proceeds to step S64.

(Step S64) The combination selection unit 17 determines whether there is any other piece of source code whose power consumption P has not been added to parameter P_base. If such source code is found (Yes at step S64), the combination selection unit 17 goes back to step S62 and performs subsequent steps. If no such source code remains (No at step S64), it proceeds to step S65.

(Step S65) With reference to the code-power association table 18a, the combination selection unit 17 produces source code combinations and then proceeds to step S66.

(Step S66) The combination selection unit 17 calculates power consumption P_comb by adding up power consumption values associated with a source code combination produced at step S65. The combination selection unit 17 then proceeds to step S67.

(Step S67) The combination selection unit 17 determines whether the power consumption P_comb of step S66 is smaller than parameter P_base of step S63. If power consumption P_comb is smaller than parameter P_base (Yes at step S67), the combination selection unit 17 proceeds to step S68. If power consumption P_comb is greater than or equal to parameter P_base (No at step S67), the combination selection unit 17 goes back to step S66.

(Step S68) The combination selection unit 17 assigns the value of parameter P_base to power consumption P_comb and then proceeds to step S69.

(Step S69) The combination selection unit 17 determines whether there is any other source code combination whose power consumption P_comb has not been calculated. If such a source code combination is found in the code-power association table 18a (Yes at step S69), the combination selection unit 17 goes back to step S66 to perform subsequent steps. If no such source code combination is found (No at step S69), the combination selection unit 17 proceeds to step S70 in FIG. 26.

(Step S70) With reference to the power consumption field in the code-power association table 18a, the combination selection unit 17 determines whether there are a plurality of source code combinations with the same power consumption. If there are such source code combinations (Yes at step S70), the combination selection unit 17 proceeds to step S71. If the source code combinations have different values of power consumption (No at step S70), the combination selection unit 17 terminates the present process of optimal source code selection.

(Step S71) With reference to the code-revision-associated method field in the code-power association table 18a, the combination selection unit 17 selects one source code combination relevant to parameter P_base and then proceeds to step S72.

(Step S72) The combination selection unit 17 obtains the number cnum of methods used in the source code selected at step S71. The combination selection unit 17 then proceeds to step S73.

(Step S73) The combination selection unit 17 compares cnum with code_num, where code_num is a parameter prepared for seeking the minimum number of methods. If parameter code_number is smaller than or equal to the number cnum of methods (Yes at step S73), the combination selection unit 17 proceeds to step S76. If parameter code_number is greater than cnum (No at step S73), the combination selection unit 17 proceeds to step S74 to obtain the next number of methods for cnum.

(Step S74) The combination selection unit 17 substitutes the number (cnum) of methods for parameter code_num and then proceeds to step S75.

(Step S75) The combination selection unit 17 selects method combinations corresponding to parameter code_num and then proceeds to step S76.

(Step S76) The combination selection unit 17 determines whether the code-power association table 18a contains any other combination of parameters that has not undergone steps step S71 to S75. If such a combination of parameters is found in the code-power association table 18a (Yes at step S76), the combination selection unit 17 goes back to step S71 and executes subsequent steps. If no such combination of parameters is found (No at step S76), the combination selection unit 17 terminates the present process of optimal source code selection.

The above-described process ends with a final source code combination selected at step S75 as satisfying parameter P_base, which is source code with the smallest power consumption. The application developing unit 16a displays the obtained source code on monitor 104a.

The process of optimal source code selection calculates power consumption of the revised portion of source code and compares the result with those of the previous versions of source code, thus reducing the labor of calculating power consumption. Since the selection is based on the comparison of power consumption between the previous source code and revised source code, the design engineer may not have to designate a target power consumption.

The above-described design-aiding apparatus 10a of the third embodiment offers advantages similarly to the design-aiding apparatus 10 according to the second embodiment. In addition, the proposed design-aiding apparatus 10a provides additional advantages discussed below.

According to the third embodiment, the design-aiding apparatus 10a is designed to have a code-power association table 18a for collecting past records of source code revisions made by the design engineer. The design-aiding apparatus 10a employs a combination selection unit 17 configured to find source code with a minimum power consumption, and an application developing unit 16a configured to display a balloon 166 on the monitor 104a to suggest possible choices for the methods corresponding to the source code with a minimum power consumption. The balloon 166 seen on the monitor 104a enables the design engineer to revise his or her program by using the suggested methods, so that the power consumption of the program as a whole can be reduced.

Also, according to the third embodiment, the combination selection unit 17 is configured to compile a code-in-use table 18b for use in the process of optimal source code selection. This feature enables the design engineer to seek which portion of source code, if modified, would contribute to the achievement of the desired improvement ratio and power consumption even in the case where he or she has revised the source code multiple times.

While the proposed design-aiding apparatuses 10 and 10a have been described as being each implemented on a single processor platform, it is also possible to use a plurality of processing devices to distribute the processing workload. For example, one processing device may perform association analysis to generate a set of association analysis information 115b to 115d, and another processing device may use these results to compile a power tendency table 13a.

The above sections have exemplified several embodiments of the proposed design-aiding apparatus, method, and program. It is not intended, however, to limit the embodiments to those specific implementations. For example, the described components may be replaced with other components having equivalent functions. The embodiments may also include other components or processing operations. Where appropriate, two or more components and features provided in the embodiments may be combined in a different way.

The above-described processing functions may be implemented with a computer system. To achieve this implementation, the instructions describing those functions of the design-aiding apparatus 1, 10, or 10a are encoded and provided in the form of computer programs. A computer system executes those programs to provide the processing functions discussed in the preceding sections. The programs may be encoded in a computer-readable storage medium. Such computer-readable storage media include magnetic storage devices, optical discs, magneto-optical storage media, semiconductor memory devices, and other tangible storage media. Magnetic storage devices include hard disk drives, flexible disks (FD), and magnetic tapes, for example. Optical disc media include DVD, DVD-RAM, CD-ROM, CD-RW, and others. Magneto-optical storage media include magneto-optical discs (MO), for example.

Portable storage media, such as DVD and CD-ROM, may be sold for distribution of program products. Network-based distribution of software programs may also be possible, in which case several master program files are made available on a server computer for downloading to other computers via a network.

For example, a computer stores various software components in its local storage device, which have previously been installed from a portable storage medium or downloaded from a server computer. The computer executes programs read out of the local storage device, thereby performing the programmed functions. Where appropriate, the computer may execute program codes read out of a portable storage medium, without installing them in its local storage device. Another alternative method is that the user computer dynamically downloads programs from a server computer when they are demanded and executes them upon delivery.

It is further noted that the above processing functions may be executed wholly or partly by a central processing unit (CPU), microprocessor (MPU), digital signal processor (DSP), application-specific integrated circuit (ASIC), programmable logic device (PLD), or other electronic circuit devices, or their combinations. These processing devices are referred to collectively as "processors." As mentioned elsewhere, the proposed processing functions may be performed by a plurality of such processing devices. The person skilled in the art would appreciate that the term "processor" may refer not only to a single processing device, but also to a multiprocessor system including two or more processing devices.

Several embodiments and their variations have been discussed above. According to an aspect of those embodiments, the proposed techniques make is possible to collect data about power consumption resulting from execution of programs.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A design-aiding apparatus comprising:
a processor configured to perform a procedure including:
performing association analysis of functions used in a software program under development and calculating, from a result of the association analysis, indicators each indicating a possibility that executing a source code including a plurality of functions in combination improves power consumption, relative to a case of executing a plurality of source codes each including one of the plurality of functions each of the indicators being a piece of information that indicates magnitude of a probability that the source code including the plurality of functions consumes more power than in the case of executing the plurality of source codes each including one of the plurality of functions;
producing analysis information that associates combinations of functions with the indicators calculated therefor;
searching source code of the software program under development to find a source code portion that includes one of the combinations of functions in the analysis information when a probability of the one of the combinations of functions is greater than or equal to a specified threshold; and
displaying the found source code portion in a manner distinguishable from other portions of the source code.

2. The design-aiding apparatus according to claim 1, wherein the procedure further includes: extracting a combination of functions corresponding to a changed portion of the source code of the software program under development; executing again the association analysis with the extracted combination of functions; and
displaying a value that indicates whether the power consumption increases or decreases when the functions are executed in combination as described in the changed portion of the source code.

3. The design-aiding apparatus according to claim 1, wherein:
the analysis information is produced individually for a plurality of values of power consumption; and
the searching searches for a source code portion by using the analysis information corresponding to one of the values of power consumption that is designated.

4. The design-aiding apparatus according to claim 1, wherein the producing produces the analysis information individually for a plurality of values of power consumption by extracting at least a combination of functions that provides a highest value of indicator.

5. The design-aiding apparatus according to claim 1, wherein the procedure further includes:
producing association information each time a portion of the source code is changed, the association information associating the changed portion of the source code with an identifier of a combination of functions that corresponds to the changed portion, and also with a value of power consumption that is expected when the combination of functions are executed in combination;
obtaining, in response to a subsequent change to another portion of the source code, power consumption of the subsequently changed portion of the source code from the association information, and selecting a combination of functions that provides a highest value of indicator; and
displaying the selected combination of functions.

6. The design-aiding apparatus according to claim 5, wherein:
the procedure further includes producing code improvement information about each changed portion of the source code, the code improvement information associating a combination of functions used in that changed portion with a value indicating reduction of power consumption that results from that changed portion of the source code; and
the producing of the association information uses the code improvement information and the analysis information to produce the association information.

7. The design-aiding apparatus according to claim 5, wherein:
when a plurality of combinations of functions equally provide a highest value of indicator, the selecting selects one of the plurality of combinations that includes a smallest number of functions.

8. The design-aiding apparatus according to claim 1, wherein the procedure further includes producing code improvement information about each changed portion of the source code, the code improvement information associating a combination of functions used in that changed portion with a value indicating reduction of power consumption that results from that changed portion of the source code.

9. The design-aiding apparatus according to claim 1, wherein the calculating of the indicators includes calculating power consumption resulting from each function executed in the software program, based on an execution log of the software program under development.

10. A design aiding method comprising:
performing, by a processor, association analysis of functions used in a software program under development and calculating, from a result of the association analysis, indicators each indicating a possibility that executing a source code including a plurality of functions in combination improves power consumption, relative to a case of executing a plurality of source codes each including one of the plurality of functions, each of the indicators being a piece of information that indicates magnitude of a probability that the source code including the plurality of functions consumes more power than in the case of executing the plurality of source codes each including one of the plurality of functions;
producing, by the processor, analysis information that associates combinations of functions with the indicators calculated therefor;
searching, by the processor, source code of the software program under development to find a source code portion that includes one of the combinations of functions in the analysis information when a probability of the one of the combinations of functions is greater than or equal to a specified threshold; and
displaying the found source code portion in a manner distinguishable from other portions of the source code.

11. A non-transitory computer-readable medium storing a design aiding program which causes a computer to perform a procedure comprising:
performing association analysis of functions used in a software program under development and calculating, from a result of the association analysis, indicators each indicating a possibility that executing a source code including a plurality of functions in combination improves power consumption, relative to a case of executing a plurality of source codes each including one of the plurality of functions, each of the indicators being a piece of information that indicates magnitude of a probability that the source code including the plurality of functions consumes more power than in the case of executing the plurality of source codes each including one of the plurality of functions;
producing analysis information that associates combinations of functions with the indicators calculated therefor;
searching source code of the software program under development to find a source code portion that includes one of the combinations of functions in the analysis information when a probability of the one of the combinations of functions is greater than or equal to a specified threshold; and
displaying the found source code portion in a manner distinguishable from other portions of the source code.

* * * * *